United States Patent [19]

Miyake et al.

[11] Patent Number: 4,954,762

[45] Date of Patent: Sep. 4, 1990

[54] METHOD AND APPARATUS FOR CONTROLLING TRACKING PATH OF WORKING POINT OF INDUSTRIAL ROBOT

[75] Inventors: Norihisa Miyake, Matsudo; Masaki Sumita, Yachiyo; Shinichi Sarugaku, Funabashi, all of Japan

[73] Assignees: Hitachi, Ltd, Tokyo; Hitachi Keiyo Engineering Co., Ltd., Narashino, both of Japan

[21] Appl. No.: 472,082

[22] Filed: Jan. 30, 1990

[30] Foreign Application Priority Data

Feb. 1, 1989 [JP] Japan .................................. 01-020712

[51] Int. Cl.$^5$ ............................................ G06F 15/46
[52] U.S. Cl. ........................... 318/568.19; 318/568.13; 318/574; 364/474.32; 364/513; 901/42; 219/124.34
[58] Field of Search ................................. 318/560–640; 364/474, 28, 474.35, 513; 901/14–24; 219/124, 34, 125.12

[56] References Cited

U.S. PATENT DOCUMENTS

| | | | |
|---|---|---|---|
| 4,150,329 | 4/1979 | Dahlstrom | 318/574 |
| 4,287,459 | 9/1981 | Dahlstrom | 364/513 X |
| 4,529,921 | 7/1985 | Moribe | 318/568.13 |
| 4,541,060 | 9/1985 | Kogawa | 318/574 X |
| 4,550,383 | 10/1985 | Sugimoto | 364/513 |
| 4,590,577 | 5/1986 | Nio et al. | 364/513 |
| 4,621,333 | 11/1986 | Watanabe | 318/574 X |
| 4,672,190 | 6/1987 | Rostkowski et al. | 318/577 X |
| 4,677,276 | 6/1987 | Nio et al. | 318/574 X |
| 4,704,687 | 11/1987 | Kishi et al. | 364/474.32 |
| 4,706,000 | 11/1987 | Kishi et al. | 318/568.19 |
| 4,728,872 | 3/1988 | Kishi et al. | 318/567 X |
| 4,771,222 | 9/1988 | Nakashima et al. | 318/572 |
| 4,868,473 | 9/1989 | Kato | 318/573 X |

*Primary Examiner*—William M. Shoop, Jr.
*Assistant Examiner*—Paul Ip
*Attorney, Agent, or Firm*—Antonelli, Terry, Stout & Kraus

[57] ABSTRACT

A method and apparatus for controlling the tracking path of a working element so that the working element moves along a path having a predetermined positional relationship with a working object by adjusting the relative positional relationship between the working element and the working object through the movement of individually movable at least one moving element. The method and apparatus allot individual coordinate systems each having a discriminator to the working element, the working object and the moving elements to provide coordinate systems with the corresponding discriminators, set as a coordinate system expressing the data for controlling the movement of the working element a first coordinate system selected from the coordinate systems, describe, using a second coordinate system selected from the coordinate systems, the data representing the positions of the working element corresponding to specific points on the tracking path along which the working element is to move on the basis of a prescribed working schedule, store these data together with the discriminators representative of the corresponding coordinate systems, decide in executing a real work if or not the first coordinate system and the second coordinate system are the same from their discriminators, and, if both coordinate systems are different coordinate systems, converts the position data of the working element corresponding to the specific points into the data expressed in the first coordinate system, and control the movement of the working element on the basis of the converted data.

9 Claims, 16 Drawing Sheets

FIG. 15

| COORDINATE SYSTEM NAME (SYMBOL) | COORDINATE SYSTEM DISCRIMINATOR NUMBER |
|---|---|
| TOOL COORDINATE SYSTEM | 0 |
| ROBOT COORDINATE SYSTEM ($\Sigma R$) | 1 |
| UNIVERSAL COORDINATE SYSTEM ($\Sigma U$) | 2 |
| PERIPHERAL COORDINATE SYSTEM ($\Sigma P$) | 3 |
| STAGE COORDINATE SYSTEM ($\Sigma B$) | 4 |
| WORK COORDINATE SYSTEM ($\Sigma W$) | 5 |

| TENSE NAME | SYMBOL | TENSE DISCRIMINATOR NUMBER |
|---|---|---|
| TEACHING TIME | $t_T$ | 1 |
| OPERATION START TIME | $t_S$ | 2 |
| CURRENT TIME | $t_C$ | 3 |

METHOD AND APPARATUS FOR CONTROLLING TRACKING PATH OF WORKING POINT OF INDUSTRIAL ROBOT

BACKGROUND OF THE INVENTION

1. Field of the Invention

The present invention relates to a method and apparatus for controlling the tracking path on which the working point of e.g. an industrial robot, which is driven by plural movable elements, is to move, and more particularly to the controlling method and apparatus which can easily deal with the change in the moving conditions of the respective movable elements and the modification of the tracking path of the working point which is to be made for cooperation with peripheral devices.

2. Description of the Related Art

In an automatic working machine such as an industrial robot, its working element, i.e. working tool, is driven by plural moving elements which can individually move. In order to control the tracking path of the working tool, it is convenient to describe the tracking path of the working tool using an orthogonal coordinate system; such technique has been widely adopted.

The controlling technique called "teaching playback" has been widely adopted to control the conventional industrial robot or the like. This technique usually carries out the driving control of the robot as follows. First, representative points on the required orbit of the working tool attached to the working point of the robot are successively positioned and stored in a memory. Thereafter, in order that the working tool moves on the given tracking path which is obtained by linking the representative points using straight lines and arcs, the displacements of the respective freedoms constituting the robot mechanism, i.e. individually movable moving elements are calculated by arithmetic operations. The method of the arithmetic operations is disclosed in e.g. R. Paul: Robot Manipulator: MIT Press, 1981.

Thus, describing the tracking path of the working tool using an orthogonal coordinate system has the advantages that a man manipulating the robot can easily understand the operation, the working path can be expressed in the form independent from the mechanism of the robot, and other advantages. In this case, as an orthogonal coordinate system for describing the tracking path, a coordinate system fixed to the base of the robot (hereinafter referred to as a robot coordinate system) is usually used. This is because in the case where the control technique of the teaching playback as mentioned above is used, any origin position of the coordinate system and any pose thereof may be used as long as they can be uniquely defined, and because the procedure of obtaining the relation between the displacements of the mechanism freedoms in the robot and the position and pose of the working tool can be most easily provided as in the above example.

Meanwhile, in many cases, the whole production system including robots can attain its object by not only individually using the working machines such as robots but also by using them in cooperation with several peripheral machines. The peripheral machines are mainly composed of a positioner for setting the position and pose of a working object, a conveyor for conveying the object, a traveling truck for expanding the movable range of the robot, a sensor attached to the working point of the robot, and another sensor attached in the neighborhood of the robot for sensing the working environment. Thus, in controlling the whole production system including the robots, it is important to take the cooperation between the robots and the above peripheral machines.

The respective components constituting the production system are controlled (for, e.g. positioner) or supplied with information (for, e.g. sensors) usually using the coordinate systems peculiar to the components (e.g. positioner). Therefore, it is indispensable to carry out the coordinate conversion operation in accordance with the coordinate system peculiar to each peripheral machine between the robot centrally located in the production system and the respective machines.

Such coordinate system conversion has been adopted also in the prior art. For example, in the system in which the tracking path of the working poi of a robot is modified in accordance with the condition of a working object using a sensor attached to the working tool, as disclosed in Bamba et al: A Visual Seam Tracking System for Arc-Welding Robots; Proceedings of 14th International Symposium on Industrial Robots, 1984, the information given by a sensor is expressed using a coordinate system fixed to the sensor and this expression is converted into the expression by the coordinate system fixed to the base of the robot, thus modifying the tracking path.

In recent years, the technique of "off-line programming", which is slightly different from the above example, has been also used. In the off-line programming, a product is designed by the technique of e.g. CAD (computer-aided-design), and its shape data are used to create the tracking path information of a robot. In this case also, the tracking path to be followed by the working tool is previously described using the coordinate system fixed for a product, i.e. a working object for the robot, the described tracking path is converted into that in another coordinate system fixed to the base of the robot on the basis of a presumed relative positional relation between the working object and the robot, and the tracking path described in another coordinate system is sent to a robot control apparatus to control the driving of the robot.

As a modification of the off-line programming, a technique of using e.g. a robot language has also been proposed. Its typical example is disclosed in Mujtaba, Goldman; AL User's Manual, Stanford University Report. No. STAN-CS-81-889, 1981. In this article, an idea of using plural coordinate systems is disclosed, but the main idea is to convert the data, before they are sent to a robot, into those in the coordinate system fixed to the base of the robot, as in the above example; a robot control apparatus controls the robot using the data in the coordinate system fixed to the base of the robot.

As understood from these examples, in order to control a robot, particularly a system including peripheral machines, it is indispensable to carry out the operation for the conversion between the coordinate system fixed to the base of a robot and the other coordinate systems.

A traditional technique for carrying out the conversion operation between plural coordinate systems is to describe an equation for the conversion operation in a form of fixed software program. For example, in the case where the working tool of a robot is to be controlled so as to follow a working object moving on a conveyor, the position of a target point on the path given by a teaching machine, or the like is calculated on the coordinate system fixed to the base, and thereafter it is corrected by the moving amount by the conveyor; such a technique is disclosed in e.g. JP-A-5284669. Although this correction operation means the conversion operation between the coordinate system moving with the movement of the conveyor and the robot coordinate system, the operation logic is usually fixedly described in a program in the form of a correction operation (In this case, in order to provide flexibility for the change in the moving direction of the conveyor, it is proposed to generalize a unit vector in the form of a direction cosine in the robot coordinate; in any way, the operation logic is fixedly described).

Moreover, in order to modify the tracking path of the working tool of a robot in accordance with a working object using the sensor attached to the working tool of the robot, a sensor feedback control such as seam tracking is usually carried out. In this case also, as mentioned above, the information given by the sensor is described in the coordinate system fixed for the sensor itself. The information is converted into the expression in the robot coordinate system, or in a coordinate system fixed to the working tool or working element (hereinafter referred to as a robot working point coordinate system, and the converted information is superposed on a taught path. In this way, the driving control of the robot is carried out. This example is disclosed in e.g. Proceedings of 14th International Symposium on Industrial Robots, pp. 365–374, 1974. In such a case also, the conversion operation between the sensor coordinate and the robot coordinate or working point coordinate is usually fixedly described in a software program (flexibility for parameters used for the conversion operation is usually considered). More specifically, the program is fixedly described so that the information given by the sensor is reflected on the operation control of a robot after it has been always subjected to the above conversion.

The same technique has been used in also the cases where a working object, i.e. work is set on a positioner, and the information such as working environment is to be obtained using the sensor fixed to the base of the robot.

Furthermore, in the off-line programming in which the operation of a robot is controlled on the basis of the shape data of a working object obtained using e.g. CAD, the relationship between the robot and the working object is previously presumed, the tracking path to be traced by the robot, which is expressed in the coordinate system fixed to the working object (hereinafter referred to as a work coordinate system) in accordance with that relationship, is converted into that in the robot coordinate system through the off-line processing, and the tracking path information of the robot expressed in the robot coordinate system is sent to a robot control apparatus to control the driving of the robot. In this case also, the conversion operation between the coordinate system fixed to the working object (work coordinate system) and the robot coordinate system is executed in the formulated form as meeting a predetermined relation. The tracking path in the robot control apparatus is always expressed in the robot coordinate system, and so the robot control apparatus does not usually have the concept of the work coordinate system.

In the prior arts described above, the robot system is controlled using a dedicated processing prepared as a software program in accordance with the individual arrangements or characteristics of a robot and its peripheral devices. Therefore, in the case where the environment of using the peripheral devices, such as their construction, arrangement, etc. is changed, or the addition of a new function to the robot or change in the function of the robot is to be made, the corresponding software program must be prepared. For example, in the cases where the robot is to be mounted on a traveling truck, it is to be moved in synchronism with the conveyor, change or addition for the construction of the system including the robot is to be made, and the construction thereof is to be corrected in view of the relationship among the components of the system, the corresponding dedicated software program must be changed or added.

Thus, the prior arts are problematic in maintenance of the software incorporated in the robot control apparatus, and offer several problems of the increase of software capacity, the increase in the number of steps required to change or add the software, and the limitation to the applicability or expandability of the control apparatus.

SUMMARY OF THE INVENTION

An object of the present invention is, in a system for controlling the tracking path of a working element, as in a system for machining a working object with a working tool provided at the working point of a working robot so that the working element moves along a path having a predetermined positional relationship with the working object by adjusting the relative positional relationship between the working element and the working object through the movement of individually movable at least one moving element each being operatively coupled with either the working element or the working object in a prescribed coupling condition, to provide a method and apparatus for controlling the tracking path of the working element which can easily deal with the change of the moving condition of the moving elements, and the increase or decrease in the number of the moving elements without changing the structure of a basic software program, and versatilely applicable to the systems having the same format by using the process for controlling the movement of each moving element in common.

In order to attain the above object, the method and apparatus in accordance with the present invention, in a system for controlling the tracking path of a working element so that the working element moves along a path having a predetermined positional relationship with the working object by adjusting the relative positional relationship between the working element and the working object through the movement of individually movable at least one moving element each being operatively coupled with either the working element or the working object in a prescribed coupling condition, allotting individual coordinate systems each having a discriminator to the working element, the working object and the moving elements to provide the coordinate systems with the corresponding discriminators, setting as a coordinate system expressing the data for controlling the movement of the working element a first coordinate system selected from the coordinate systems, describing, using a second coordinate system selected from the coordinate systems, the data representing the positions of the working element corresponding to specific points on the tracking path along which the working element is to move on the basis of a prescribed working schedule, storing these data together with the discriminators representative of the corresponding coordinate systems, deciding in executing a real work if or not the first coordinate system and the second coordinate system are the same from their discriminators and, if both coordinate systems are different, converting the position data of the working element corresponding to the specific point into the data expressed in the first coordinate system and controlling the movement of the working element on the basis of the converted data.

Additionally, since the tracking path of the working element is usually defined by its relative position for the working object, it is convenient to use the coordinate system fixed to the working object as the second coordinate system, and use the coordinate system fixed to the working element as the first coordinate system. The data representative of the position of the working element corresponding to the above specific point can be uniquely defined in accordance with the prescribed coupling condition correlating the moving elements, and also the data expressed in the second coordinate system can be easily converted into the data expressed in the first coordinate system based on the rule defined by the above coupling condition.

In controlling an industrial robot, the data representative of the error information including an attachment error of a working element (e.g. working tool), a position error of a working object, etc. which can be sensed by a sensor, and the data representative of the movement information obtained when the peripheral devices on which the robot or the working object is located moves can be used for the control; also they can be used in the form expressed in the coordinate system which is most convenient to process and the coordinate system of the data can be discriminated by the above discriminator. The conversion operation between the discriminated coordinate systems is executed by conversion means so as to convert input information into its expression in a required coordinate system for control. These items of information can be used for the control of the operation such as the creation or change of the tracking path. Likewise, the information thus obtained can be converted again into the expression in the coordinate system fixed to the base of the robot or in the coordinate system specific to each peripheral device through the discriminating means and conversion means.

In this way, if it is assumed that information is converted among the robot and the peripheral devices by the coordinate discriminating means and the coordinate conversion means, by specifying the information required to discriminate the coordinate systems in accordance with e.g. the object of control, several functions can be easily realized using the same control means and software program.

More specifically, in accordance with the present invention, consistency among plural devices constituting a system can be assured and the total control for the system including cooperation, synchronization, etc. among the devices can be made by the combination of means for comparing the discriminator of a specified coordinate system expressing input information data with the discriminator of a control coordinate system in which the processing such as control is to be carried out, and, if the compared discriminators are different, for successively taking out a conversion matrix or a group of conversion matrices between both coordinate systems (if the compared discriminators and so the coordinate systems coincide, the conversion is not required, but as the case may be, the data must be transferred), means for applying the conversion determinant thus prepared to the input data to be converted into the specified coordinate system, means for comparing the discriminator of the coordinate system expressing the data obtained as a result of a control processing (i.e. the discriminator of the coordinate system in which the processing as control is to be carried out) with the coordinate system or its discriminator of final output data, and if they are different, preparing a conversion matrix or a group of conversion matrices, and means for applying the conversion matrix thus prepared to the data obtained as a result of the control processing to be converted into a final output coordinate system.

BRIEF DESCRIPTION OF THE DRAWINGS

FIG. 15 is a table showing an example of the correspondence between coordinate systems and their discrimination number;

DESCRIPTION OF THE PREFERRED EMBODIMENTS

Figure 1:
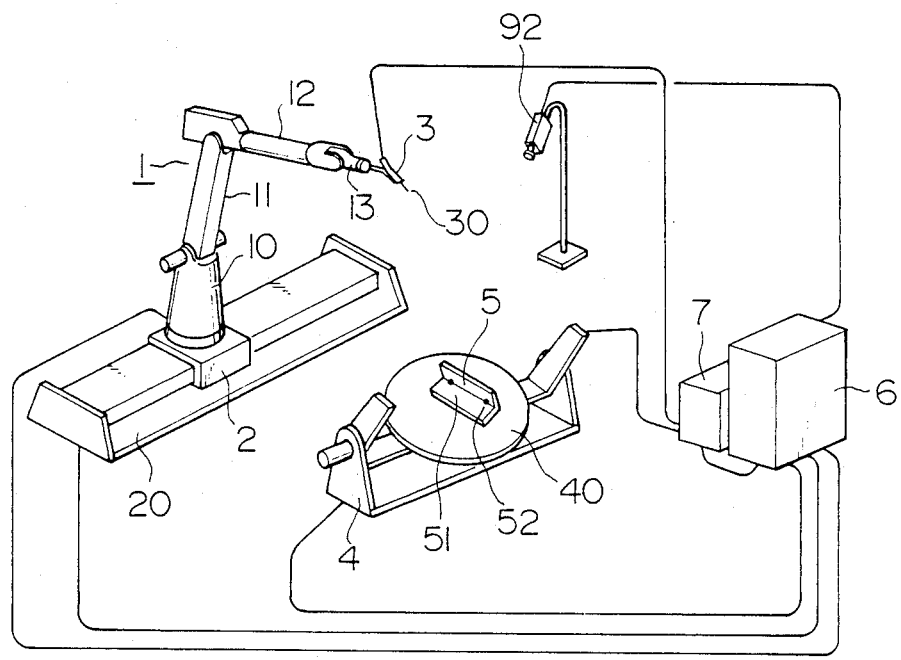
FIG. 1 is a perspective view of the system to which an embodiment of the present invention is to be applied.

Now referring to FIGS. 1 to 5, embodiments of the present invention will be explained. FIG. 1 shows an example of the production system incorporating a robot 1. Robot 1, which is a multi-joint type robot having plural, for example, 6 (six) freedoms, is mounted on a traveling stand vehicle 2. A welding torch 3 serving as a working tool is fixed to the working point of robot 1. A positioner 4 is arranged within the working area of robot 1, and a working object 5 is located on positioner 4. Robot 1, the above respective peripheral and welding machine 7 are connected with a control device 6. Although not explained in connection with this embodiment, a visual sensor 92 which will be explained in another embodiment of the present invention is also shown.

In the system shown in FIG. 1, robot 1 works the welding operation or the working object 5 using welding torch 3. An end 30 of welding torch 30 is an actual working point, and so robot 1 is controlled directing attention to working point 30. In this case, traveling truck 2 or positioner 4 can be moved simultaneously with robot 1 while the welding is carried out; in accordance with the shape and size of working object 5, working condition, etc. either one of robot 1, traveling truck 2 and positioner 4 may operate, or two or more of them may operate. Also, strictly speaking, the state (position, posture, etc.) of working object 5 for positioner 4 varies whenever the working is repeatedly applied to plural working objects. Moreover, robot 1 comprises plural arms 10, 11, 12 and 13; arm 10 is rotatably attached to the truck 2 which is attached to a fixed stand base 20 so as to be movable in the longitudinal direction of the base, and these arms are adapted to be rotatable unidirectionally or bidirectionally. In this way, truck 2, and arms 10, 11, 12 and 13, which serve as moving elements for supporting working point 30, are coupled with each other under a prescribed condition, and are adapted to be individually movable under the prescribed condition.

Figure 2:
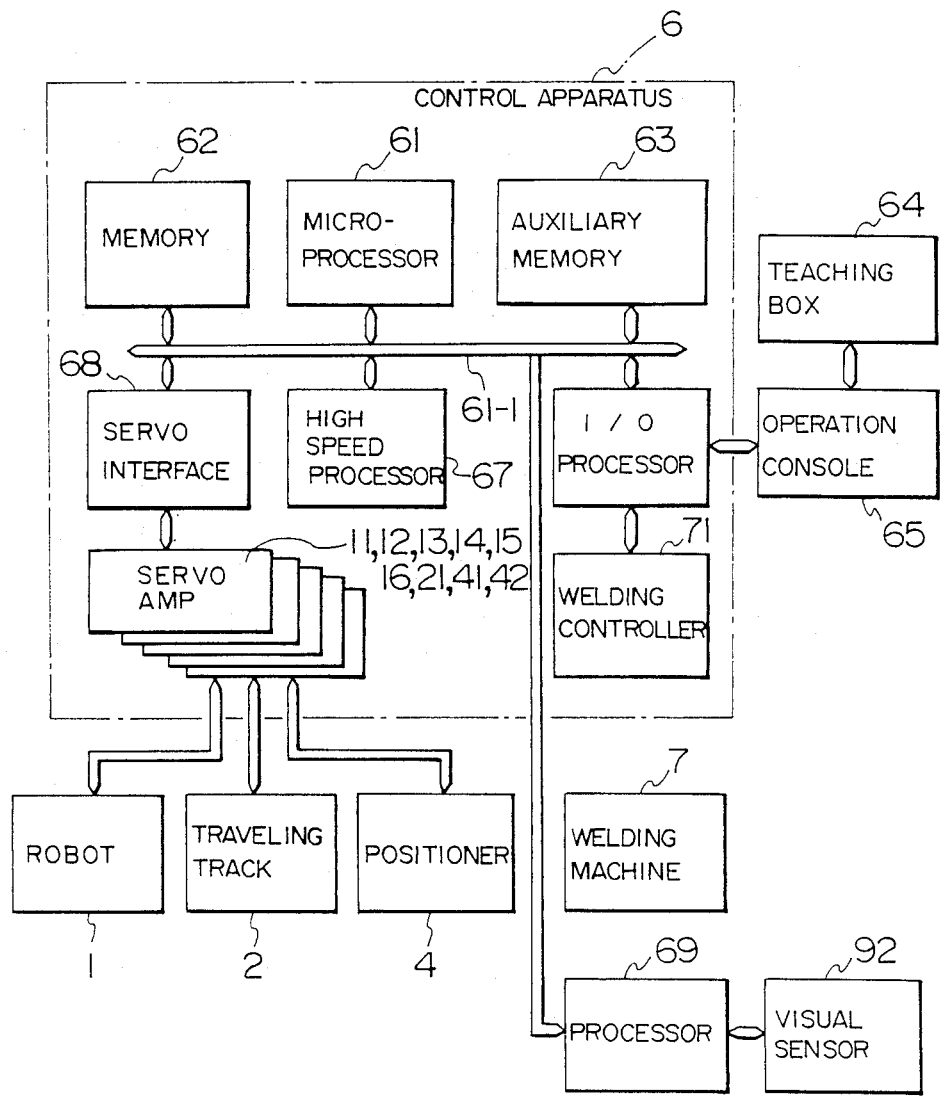
FIG. 2 is a block diagram of the control device shown in FIG. 1.

FIG. 2 shows the arrangement of control apparatus 6 for robot 1. As seen from FIG. 2, a microprocessor 61 is centrally located, and a memory 62, an auxiliary memory 63, etc. are connected with microprocessor 61 through a system bus 61-1. A teaching box 64, which manually operates robot 1, positioner 4, etc. to teach them work to be made, and an operation console 65, which orders the start and stop of actual work, are connected with control device 6 through an input/output processor 66. Likewise, a visual sensor 92 and a processing apparatus 62 are also connected with control apparatus 6. Microprocessor 61, which is provided with a high speed arithmetic device 67, is adapted to process several arithmetic operations at a high speed using the high speed arithmetic device 67.

Servo-amplifiers 14 to 19, 21, 41 and 42 which control the shafts of the freedoms of robot 1, traveling truck 2 and positioner 4 are connected with microprocessor 61 through a serve-interface 68. A controller 71 for welding machine 7 is also connected with microprocessor 61 through input/output processor 66.

In operation, robot 1, traveling truck 2 and positioner 4 are sequentially driven to specific points on the tracking path along which the working tool is to move by operating a push button (not shown) placed on teaching box 64; thus the positions of the specific points are set. Then, on the basis of the program stored in memory 62, microcomputer 61 monitors the status of teaching box 64, creates a moving (driving) command specified by an operator, and sends it to each shaft of each unit through serve-interface 68. Servo-amplifiers 14 to 19, 21, 41 and 42 serve to position the shafts at issue in accordance with the driving command. The position data of each of the units thus driven and positioned are stored in auxiliary memory 63 as required. By repeating this operation, the corresponding group of data will be stored.

On the other hand, while the working is carried out, i.e. during a "playback operation", on the basis of the processing program stored in memory 62, the group of position data are fetched from auxiliary memory 63 in accordance with a prescribed sequence, data representative of the path between the specific points are created by the processing such as interpolation, and the positions of the respective shafts of robot 1, traveling truck 2, positioner 4, etc. are defined in the same manner as mentioned above. By repeating such operations, the playback operation will be controlled. Then, as the case may be, welding machine 7 is also controlled. In this way, the welding will be completed for working object 5 using welding torch 3.

A series of control operations as described above are roughly similar to those of the conventional robot system. The details thereof and the feature of the present invention will be explained.

Figure 3:
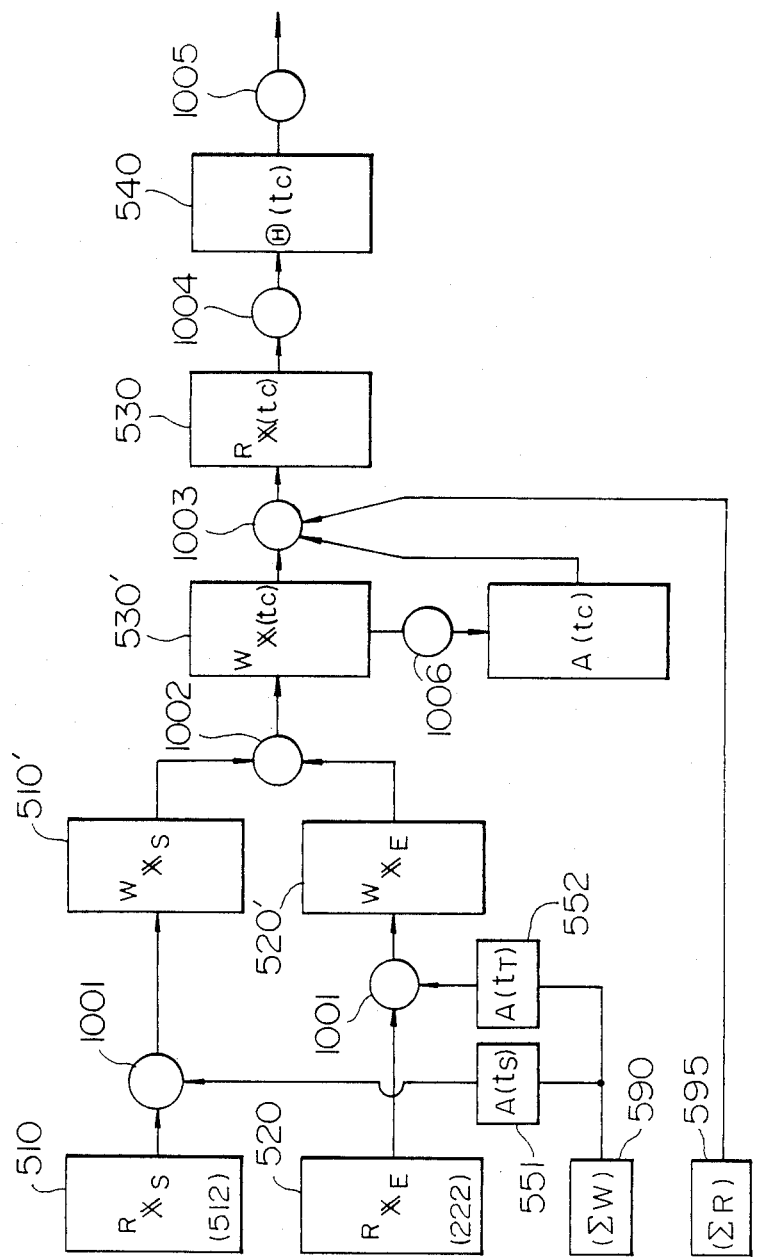
FIG. 3 is a data flow diagram in controlling the operation of the system of FIG. 1.
Figure 4:
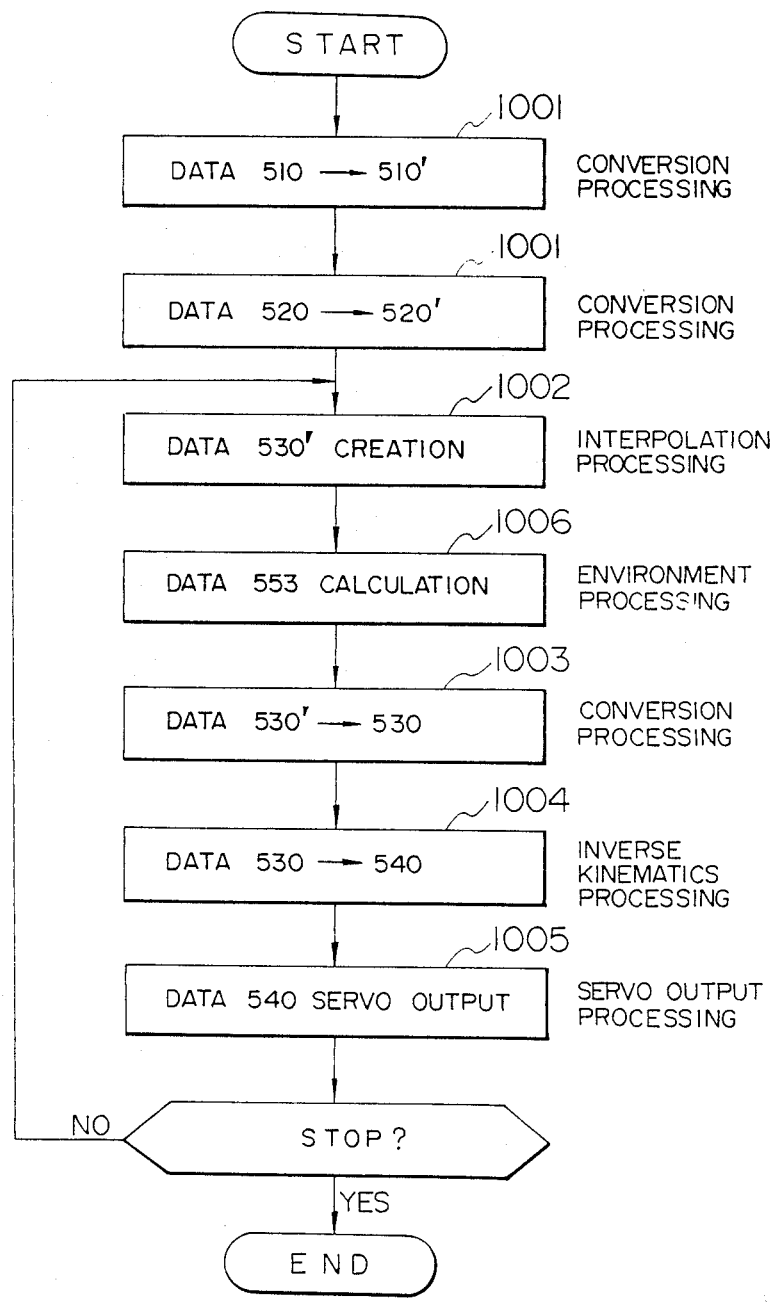
FIG. 4 is a flow chart of processing corresponding to FIG. 3.

FIG. 3 shows a data flow in the processings in the control program during the playback operation in the present invention, and FIG. 4 shows the corresponding processing flow.

Figure 5:
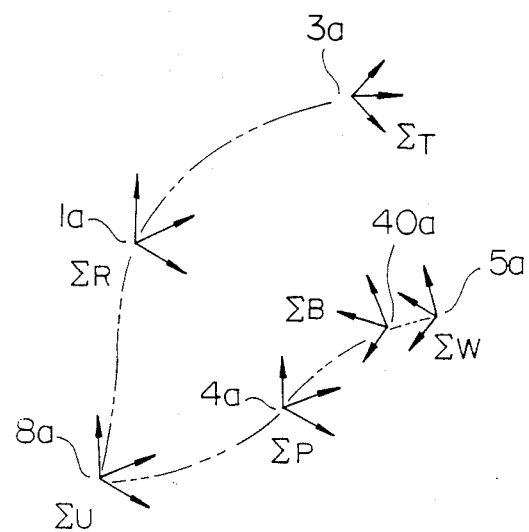
FIG. 5 is a view for explaining the coordinate system set in the system of FIG. 1.

FIG. 5 shows coordinate systems set in the system of FIG. 1, which are used in relation to the explanation of FIGS. 3 and 4. A robot coordinate system ($\Sigma R$) 1a is fixed or located on the base of robot 1; a peripheral coordinate system ($\Sigma P$) 4a is located of the base of positioner 4; a stage coordinate system ($\Sigma B$) 40a is located on the working stage 40 for fixing working object 5 in positioner 4; a work coordinate system ($\Sigma W$) 5a is located on working object 5; a tool coordinate system ($\Sigma T$) 3a is located on the working point 30 at the end of welding torch 3; and also a universal coordinate system ($\Sigma U$) 8a is located on the floor on which traveling truck 2 and positioner 4 are arranged; it should be noted that these coordinate systems are orthogonal coordinate systems. Incidentally, although robot 1 includes plural individual arms, these arms are controlled in their movement by a well known robot control mechanism based on the position of the working point expressed in the robot coordinate system ($\Sigma R$) 1a so that these arms will be generally regarded as one moving element (robot 1).

Now mainly referring to FIGS. 3 and 4 (and also FIGS. 1 and 5), the processings in a typical embodiment of the present invention will be explained.

It is assumed that with working point 30 of robot 1 positioned at a start point ($P_s$) 51 on working object 5, the operation proceeds with interpolation in order to determine intermediate positions on a straight line connecting point 51 with an end point $P_E$ (52) on working object and assumed that a position (including posture) data 510 of start point ($P_S$) 51 is expressed in robot coordinate system 1a ($\Sigma R$) and a position/pose data 520 of end point ($P_E$) 52 is also expressed in the robot coordinated system 1a ($\Sigma R$). Incidentally, in the case where working point 30 or working tool 3 is to be positioned at point 51, as the case may be, it is necessary to orient working tool 3 in a prescribed direction (pose) relative to working object 5. Data 510 and 520 are position data including such pose of the working tool.

Position/pose data 510 and 520, represented by $^R X_s$ and $^R X_e$, are generally expressed by $$X = \begin{bmatrix} n_x & O_x & a_x & P_x \\ n_y & O_y & a_y & P_y \\ n_z & O_z & a_z & P_z \\ 0 & 0 & 0 & 1 \end{bmatrix} \quad (1)$$

where $n_x$, $n_y$, $n_z$, OX, OY, OZ, $a_x$, $a_y$, $a_z$ are direction cosines of tool coordinate (ΣT) 3a relative to robot coordinate system (ΣR) 1a, and $P_X$, $P_Y$, $P_Z$ are an origin point of tool coordinate system 3a expressed in robot coordinate system 1a. The data 510 and 530 also include discrimination information such as expressed coordinate system discriminators, format discriminators, etc.

Figure 6:
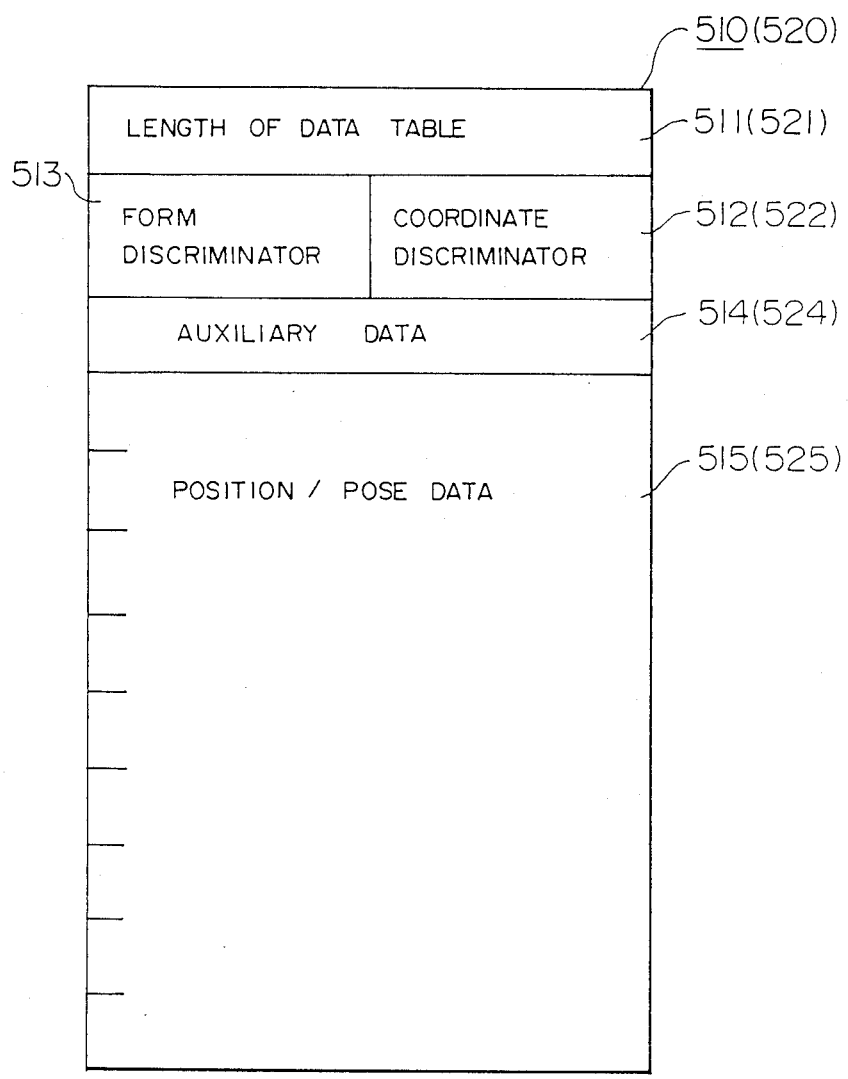
FIG. 6 is a view showing position/pose data table in which an interpolation starting point is an input data.

An example of the storage format of the position/pose data 510 of point 51 is shown in FIG. 6. 511 is a length of the data table; 512 is an expressed coordinate system discriminator; 513 is a format discriminator; 514 is an auxiliary data; and 515 is a real position/pose data. Expressed coordinate system discriminator 511, according to the present invention, is a parameter for discriminating the coordinate system in which real position/pose data is expressed. Format discriminator 513 serves to discriminate the expression format of the data that the data is expressed by arranging the elements indicated by Equation (1), by compressing the arrangement thus formed, or by using the displacement of each of the freedoms of robot 1. Auxiliary data 514 is the discriminator other than the above discriminator, or data used to select a solution in the case where there are plural sets of displacements of the freedoms of the robot which have same position and posture of the working point. Data table length 511 is prepared to hold the versatility of the data table for several formats. It should be noted that the data 520 have the same contents as 510; the corresponding elements are indicated by numbers in "( )".

Now it is assumed that the working point moves from point 51 ($P_S$) to point 52 ($P_E$) along a specific tracking path such as a straight line and curve in accordance with a predetermined working schedule, and the control during the time is made for working object. In order to carry out this control, a control coordinate system data table 590 is used; discriminators of several coordinate systems as shown in FIG. 5 are set as data 590. The contents of each discriminator are the same as those of the expressed coordinate system discriminators 511, 522 of data 510, 520.

As mentioned above, data 510 and 520 are expressed in robot coordinate system 1a. On the other hand, a discriminator 591 of working object coordinate system 5a is specified for control coordinate system data 590. Therefore, in the control program, as shown in FIG. 3, the discriminators 511 and 522 of the coordinate system expressing the data of an interpolation start point (point 51 corresponding to the position/pose of the robot at this time) and target or end point 52 are compared with the discriminator 591 of the control coordinate system. If they are different, a conversion arithmetic processing 1001 is carried out to provide start point data 510' and end point data 520' expressed in the control coordinate system with discriminator 591.

The conversion between two orthogonal coordinate systems can be expressed by a matrix consisting of four rows and four columns as expressed in Equation (1). Now it is assumed that the conversion (matrix) from robot coordinate system (ΣR) 1a into universal coordinate system (ΣU) 8a is $A_U{}^R$; its reverse conversion is $A_R{}^U$; the conversion from work coordinate system (ΣW) 5a into stage coordinate system (ΣB) is $A_B{}^W$, its reverse conversion is $A_W{}^B$; the conversion from stage coordinate system 40a into peripheral coordinate system (ΣP) is $A_P{}^B$, its reverse conversion is $A_B{}^P$; and the conversion from peripheral coordinate system 4a into universal coordinate system 8a is $A_U{}^P$, its reverse conversion is $A_P{}^U$. Then, in the case of the system of FIG. 5, the position/pose RX expressed by robot coordinate system can be converted into the expression by the work coordinate system (ΣW) 5a as follows.

$$^W X = A_W{}^B \cdot A_B{}^P \cdot A_P{}^U \cdot A_U{}^R \cdot {}^R X \quad (2)$$

Incidentally, generally $A_R{}^U = (A_U{}^R)^{-1}$ ($A^{-1}$ is a reverse matrix). Thus, arithmetic processing 1001 means the arithmetic processing as expressed in Equation (2).

Although the conversion matrix A between two moving elements basically depends on the coupling condition therebetween, it varies with the movement of robot 1, traveling truck 2 and positioner 4 or the setting state of working object 5 so that the matrix A must be considered as a function of time t, i.e. A(t). In an interpolation process for movement from the starting point 51 ($P_S$) to the end point ($P_e$), the working point 30 is located at the starting point ($P_s$) at starting of the interpolation process. Therefore, in order to express the position/pose data 510 of the working point located at the starting point by the coordinate system 5a on the working object 5, it is necessary to use the conversion matrix at the starting time of interpolation process. Assuming that $t = t_s$ represents the time of starting the interpolation, Equation (2) corresponding to data 510 $^R X_S$ can be expressed by $$^W X_s = A_W{}^B(t_s) \cdot A_B{}^P(t_s) \cdot A_P{}^U(t_s) \cdot A_U{}^R(t_s) \cdot {}^R X_S \quad (2\text{-}1)$$

On the other hand, the position/pose data 520 of the working point located at point 52 (PE) is obtained on the basis of the relationship in the position/pose among robot 1, working object 5, etc. at a teaching time. Thus, assuming that the teaching time $t = t_T$, Equation (2) Corresponding to data 520 ($^R X_E$) can be expressed by $$^W X_E = A_W{}^B(t_T) \cdot A_B{}^P(t_T) \cdot A_P{}^U(t_T) \cdot A_U{}^R(t_T) \cdot {}^R X_E \quad (2\text{-}2)$$

Accordingly, in processing 1001, the arithmetic operations expressed by Equations (2-1) and (2-2) achieve data 510' and 520' indicating $W^{X_S}$ and $^W X_E$ expressed by Equations (2-1) and (2-2), respectively.

Next, an interpolation processing 1002 is carried out using data 510' and 520' at the two points on work coordinate system (ΣW) 5a. In the case of straight line interpolation, assuming that position data part of $^W X_S$ (which corresponds to $P_X$, $R_Y$, $P_Z$ in Equation (1)) is represented by $^W P_S = (^W P_{XS}, {}^W P_{YS}, {}^W P_{ZS})^t$ (t means transpose) in a vector form, and that of $^W X_E$ is represented by $^W P_E = (^W P_{XE}, {}^W P_{YE}, {}^W P_{ZE})^t$, the position after the interpolation $^W P_\lambda = (^W P_{X\lambda}, {}^W P_{Y\lambda}, {}^W P_{Z\lambda})^t$ can be written as a function of λ by $$^W P_\lambda = (1-\lambda)\, ^W P_S + \lambda\, ^W P_E \quad (3)$$

Incidentally, in the case of interpolation between $^W P_S$ and $^W P_E$, $0 \leq \lambda \leq 1$, and so by varying the value of λ, the interpolation position $^W P_\lambda$ at a prescribed time can be obtained. The above explanation also applies to the pose and the detail thereof will not explained here.

The interpolation position/pose data 530' is a function of time represented by $^WX(t)$, since $\lambda$ is a function of time. Assuming that $t=t_c$ represents the present time, i.e. the time at which the interpolation data 530' is obtained, $^WX(t_c)$ corresponds to the interpolation position/pose data 530'. Data 530, which has been obtained through the interpolation on the work coordinate system ($\Sigma W$) 5a, is apparently expressed by the work coordinate system ($\Sigma W$) 5a.

Next, the control coordinate system discriminator 591 of the data 530' is compared with robot coordinate system 1a. If they are different, the data 530' is converted again into the expression $^RX(t_c)$ in a final output coordinate system 595, i.e. robot coordinate system ($\Sigma R$) 1a. The arithmetic operation in this case is carried using the respective conversion matrix at the present time as follows $$^RX(t_c)=A_R{}^U(t_c)\cdot A_U{}^P(t_c)\cdot A_P{}^B(t_c)\cdot A_B{}^W(t_c)\cdot {}^WX(t_c) \quad (4)$$

Thus, $^RX(t_c)$ corresponds the interpolation position/pose data 530 expressed in robot coordinate system ($\Sigma R$) 1a.

Further, the data 530 is subjected to an inverse kinematics conversion 1004 to provide the corresponding joint angle data ($\Theta(t_c)$) 540 of robot 1. The data 540 thus obtained will be transferred to a servo system by an output operation 1005 through servo interface 68 to control the drive of robot 1. This process is not explained since it is the same as in the conventional robot system.

Additionally, in the processings described above, several conversion matrices A's, used in Equations (2-1), (2-2) and (4), such as $A(t_S)$ 551, $A(t_R)$ 552 and $A(t_c)$ must be updated as required. They are expressed by $$A(t_S)=A_W{}^B(t_S)\cdot A_B{}^P(t_S)\cdot A_P{}^U(t_S)\cdot A_U{}^R(t_S)$$

$$A(t_T)=A_W{}^B(t_T)\cdot A_B{}^P(t_T)\cdot A_P{}^U(t_T)\cdot A_U{}^R(t_T),$$

and $$A(t_c)=A_R{}^U(t_c)\cdot A_U{}^P(t_c)\cdot A_P{}^B(t_c)\cdot A_B{}^W(t_S).$$

This is executed by an environment arithmetic operation 1006 through which e.g. $A(t_c)$ 553 at $t_c$ is calculated.

The flows of the processing and data in the typical embodiment of the present invention have been generally explained hitherto. Next, the function which can be realized by the processings will be explained.

A first case of the typical embodiment is the case where robot control apparatus 6 sends a driving command to traveling truck 2 or positioner 4 to be operated in synchronism with robot 1.

Now it is assumed that robot 1 is rotatable about the traveling shaft fixed to traveling truck 2, and assumed that the position of the traveling shaft, when traveling truck 2 linearly moves on a traveling rail, is represented by the distance q from a prescribed base point on the rail, and the traveling shaft positions when the working point 30 of robot 1 coincides with points 51 and 52, respectively, on working object 5 are taught as $q_S$ and $q_E$, respectively. If the traveling shaft position is interpolated over the distance from $q_S$ to $q_E$ when the position of working point 30 is linearly interpolated over the distance from point 51 to point 52, the traveling shaft position at respective times can be expressed, using $\lambda$ in Equation (3), by $$q\lambda=(1-\lambda)q_S+\lambda q_E \quad (5)$$

In this case, interpolation 1002 carries out the calculation of Equation (5) together with that of Equation (3). Further, using the traveling shaft position $q\lambda$ thus obtained, environment arithmetic processing 1006 calculates the matrices $A_R{}^U$ and $A_U{}^R$ which represent the relationship between robot coordinate system ($\Sigma R$) 1a and universal coordinate system ($\Sigma U$). Now assuming that universal coordinate system 8a and robot coordinate system 1a are defined in a parallel relationship, and the traveling shaft is oriented in the X axis direction in both coordinate systems, $A_U{}^R$ is given by $$A_U{}^R = \begin{bmatrix} 1 & 0 & 0 & P_{RX+q} \\ 0 & 1 & 0 & P_{RY} \\ 0 & 0 & 1 & P_{RZ} \\ 0 & 0 & 0 & 1 \end{bmatrix} \quad (6)$$

where ($P_{RX}$, $P_{RY}$, $P_{RZ}$) is an Origin of robot coordinate system 1a when it is expressed by universal coordinate system 8a. The "q" in Equation (6), which corresponds to $q\lambda$ in Equation (5), can be expressed as $A_U{}^R$ (t) like the expression of $^WX(t)$. Thus, part of environment processing 1006 which changes the conversion matrix A described in Equations (2-1), (2-2) and (4) has been clarified.

By applying the same idea as in traveling truck 2 to positioner 4, interpolation arithmetic processing 1002 and environment arithmetic processing 1006 can be realized to provide conversion matrices $A_P{}^B$ and $A_B{}^P$.

Figure 7:
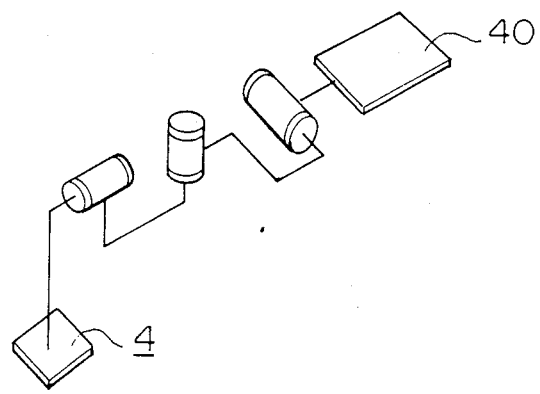
FIG. 7 is a perspective view of a positioner having three freedoms to which an embodiment of the present invention is to be applied.

Although in the above example, it has been assumed that positioner 4 is subjected, for its each freedom, to the same interpolation as in Equation (5) as in traveling truck 2, it can be assumed that the position of stage 40 changes in a three-dimensional space in relation to the base of positioner 4. For example, if positioner has three freedoms as shown in FIG. 7, without carrying out the control for each freedom, by directing attention to e.g. the origin of stage coordinate system ($\Sigma B$) 40a, it is possible to interpolate the positions $A_P{}^B$ (tT)'s at starting and target (final) points to provide the position $A_P{}^B$ ($t_c$) at any time and dissolve it into respective freedoms 4-1, 4-2 and 4-3. By expanding this idea, it is possible to control two robots in cooperation with each other.

Figure 8:
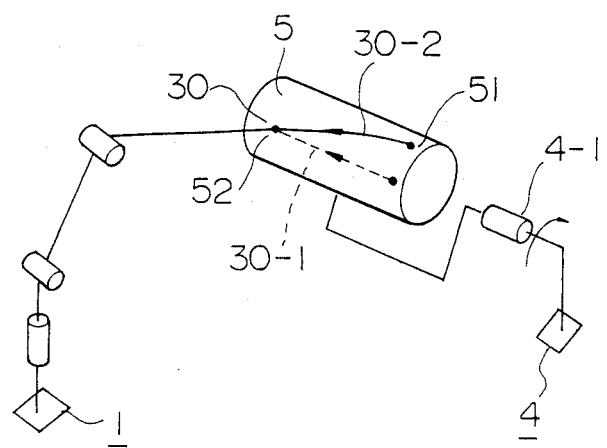
FIG. 8 is a view for explaining the cooperation between the robot and the positioner.

FIG. 8 shows an example of the cooperation between robot 1 and peripheral devices, more specifically the tracking path 30-1 of working point 30 in the robot coordinate system 1a and the path 30-2 thereof relative to working object 5 when both of robot 1 and positioner 4 operate. In FIG. 8, 51 and 52 are points corresponding to interpolation starting point $P_s$ and target point PE as mentioned previously. 4-1 is the operating direction of positioner.

Further, conversion matrices $A_P{}^U$, $A_U{}^P$, $A_W{}^B$, and $A_B{}^W$ are represented by a unit conversion matrix II given by $$II = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (7)$$

Thus, all the elements used in the operation of Equations (2-1), (2-2) and (4) are defined so that processings 1001 and 1003 can be actually executed.

As a result, while controlling cooperatively and simultaneously the drive of at least one of traveling truck 2 and positioner 4, and robot 1, it is possible to operate working point 30 along a desired tracking path on working object thereby to easily execute the working such as welding.

Incidentally, it should be noted that the traveling truck or the positioner described above are only examples, and the above explanation on them can be applied to any device as a moving robot.

Figure 9:
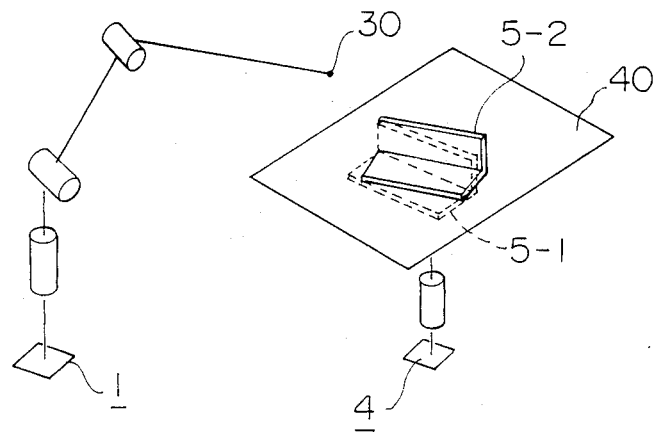
FIG. 9 is a view for explaining the setting error of the working object.

A second case of the typical embodiment of the present invention is the case where only robot 1 is controlled by control apparatus 6, and the other peripheral device such as traveling truck 2 and positioner 4 are fixed (and hence it is not necessary to consider them), but static error such as that relative to the setting state of working object 5 must be considered. Now it is assumed that positioner 4 and traveling tuck 2 are fixed, and as shown in FIG. 9, the position 5-1 of working object 5 at a time when the working has been taught is different from the position 5-2 thereof at a time when the playback operation, actual work is executed (in other words, the setting error of working object 5 is at issue). The positional relationship between stage 40 and working object 5 at a work teaching time can be described by a matrix consisting of four rows and four columns such as Equation (1) as conversion between stage coordinate system (ΣB) 40a and work coordinate system (ΣW). It is represented by $A_B^W(t_T)$ (or its inverse matrix $A_W^B(t_T)$) in the form of a function of work teaching time $t=t_T$. The positional relationship between stage 40 and working object 5 at a work executing time can also be represented by $A_B^W(t_c)$ (or its inverse matrix $A_W^B(t_c)$) in the form of a function of work executing time $t=t_c$ (current time) (it should be noted that its value is constant).

In this case, since traveling truck 2 and positioner 4 are fixed, their influence on the matrices is not required to be considered. Namely, the matrices $A_P^B$, $A_B^P$, $A_U^R$, $A_R^U$, $A_U^P$, and $A_P^U$ can be always regarded as the unit matrix II (Equation (7)) or constant regardless of time. Thus, arithmetic processings 1001 and 1003 can be executed by using Equations (2-1), (2-2) and (4). More specifically, using Equations (2-1) and (2-2), the operating points 51 and 52 on working object 5 can be determined on the basis of the positional relationship between stage 40 and working object 5 at the teaching time. Interpolation 1002 is made between the points 51 and 52. Using Equation (4), the position/pose of working point 30 at the interpolated position can be obtained on the basis of the positional relationship between stage 40 and working object at the present time or any time during the working. Thus, it is possible to execute the operation with the setting error of the working object 5 corrected. Incidentally, although the position 5-2 of working object 5 in executing the work is fixed relatively to sate 40 and $A_B^W(t_c)$ is also constant, this does not affect the above operation.

A third case of the typical embodiment of the present invention is the case were the first case and the second case are combined, and the position of e.g. positioner 4 varies during a time informal between the work teaching time and the work execution time. In this case, if conversion matices $A_U^R$, $A_R^U$, $A_P^B$ and $A_B^P$ are set as in the first case, conversion matrices $A_W^B$ and $A_B^W$ are set as in second case, and also $A_P^U$ and $A_U^P$ are set in the same idea as for $A_W^B$ and $A_B^W$, by using Equations (2-1), (2-2) and (4), the synchronous and cooperative operation between robot 1 and traveling truck 2 or positioner 4, and correction of setting error of working object 5 and positioner 4 can be simultaneously realized.

A fourth case of the typical embodiment of the present invention is the case where in operating the conversion matrices $A_U^R$, $A_R^U$, as in the matrices ($A_U^P$, $A_P^U$, etc.) representative of the setting positions in the second and third cases, the matrix of Equation (6) is subjected to the operation considering the setting position of traveling truck 2 and that of robot 1 relative to it. In this case, in addition to the third case, the setting error of robot 1 and traveling truck 2 can also be corrected. If the system at issue does not include traveling truck 2, $A_U^R$ and $A_R^U$, which represents the relationship of robot coordinate system 1a with universal coordinate system 8a, can be directly used to correct the setting error of robot 1.

As understood from the above explanation, in implementing the function of the present invention, it is necessary to take prescribed considerations on the matrices A's. As described above, with respect to traveling truck and positioner 4, while the working (playback operation) is executed, the matrices A's are calculated in environment arithmetic processing 1006 in FIG. 4. Also in teaching the work, the matrices A's may be calculated in the same manner. More specifically, in teaching the work, whenever traveling truck 2 or positioner 4 are driven by e.g. a manual operation, the same processing as 1006 is executed to update the matrices A's. The contents of calculation are the values A ($t_c$) of the respective matrices at the present time. In other word, whenever a command for the operation, regardless of kind of the operation (the manual operation or an interpolation operation for executing the work), is created, the matrix A is calculated at A ($t_c$) at the corresponding time.

Further, in teaching the work, the data representative of the position/pose of the working point 30 of robot 1 are stored, and also the matrix A ($t_c$) is stored as A ($t_T$). Additionally, the matrix A ($t_T$) is stored only when its value and content are changed so that the capacity for storing the teaching data can be reduced.

Moreover, A ($t_s$) appearing in Equation (2-1), which is defined as a value of the matrix at the starting point of each unit segment of interpolation, is regarded as A ($t_c$) at the starting time of the interpolation segment; it is easily obtained by storing the same at that time if required.

How to deal with the matrices A's to be updated by environment arithmetic processing 1006 has been explained. On the other hand, the setting position of working object 5 relative to stage 40, the conversion matrices $A_B^W(t_T)$ (and $A_W^{B1}(t_T)$) indicative of the position 5-1 in teaching the work and the matrices $A_B^W(t_c)$ (and $A_W^B(t_c)$) initiative of the position 5-2 in executing the work may be individually obtained through e.g. calibration and may be dealt within the same way as the matrices to be updated by the above environment arithmetic processing 1006. This applies to $A_U{}^P$, $A_P{}^U$, etc. in the second case. The technique for these matrices is disclosed in JP-A-59-189415 (JP-62-162359) filed by the inventors of the present application.

In accordance with the typical embodiment of the present invention hitherto explained, in the system shown in FIG. 1, the synchronous and cooperative control between robot 1 and the peripheral devices such as traveling truck 2 and positioner 4 controlled by robot control apparatus 6, correction of the errors of the setting position/pose of working object 5 and others can be unitedly realized.

Although in the above explanation it was assumed that the data of interpolation target point 52 is expressed by robot coordinate system ($\Sigma R$) 1a and work coordinate system ($\Sigma W$) 5a is specified as the control coordinate system, they may be optionally changed as understood from the description made hitherto.

For example, in the case where one of the data of interpolation starting point 51 and target point 52 is expressed by universal coordinate ($\Sigma U$) 8a and the other is expressed by work coordinate system ($\Sigma W$), these points may be controlled using robot coordinate system ($\Sigma R$) 1a as a control coordinate system. An example of expressing interpolation target point 52 by work coordinate system ($\Sigma W$) 5a is the case where the tracking path to be traced by the working point 30 of robot 1 is created by means of off-line programming using CAD design data of working object 5. In this case, in the conversion processing 1001 in FIG. 4, calculation of Equation (2—2) is not required. Specifically, data 520, which is ${}^W X_E$ itself, coincides with 520' so that the calculation of Equation (2-2) will not required. In this case also, needless to say, the functions of the cooperation between robot 1 and the peripheral devices, and correction of error in setting the working object can be implemented. Moreover, adopting robot coordinate system ($\Sigma R$) 1a as a control coordinate system corresponds to positioning working point 30 of robot 1 at a fixed point with respect of e.g. robot 1 or the other surface of the working area (corresponding to universal coordinate system 8a) regardless of the operation of traveling truck 2 and positioner 4. This is applied to the cases where robot 1 is to be positioned for the device for changing working tool 3 set at a fixed point in the working area, and robot 1 is to be moved to its shelter position (work starting and ending positions).

It will be understood from the above description that the coordinate systems expressing the data of interpolation starting point 51 and target point 52 or the control coordinate can be optionally set for each basic operation unit such as the interpolation segment of robot 1; in accordance with the robot operation can be controlled without any problem. Thus, these coordinate systems and hence their discriminators can be optionally changed for each basic operation unit also during the operation of robot 1. As a result, for example, mixing of the data taught when manually operating robot 1 with off-line programming data, and performing the cooperative operation between robot 1 and its peripheral devices or stopping it can be easily realized.

Figure 10:
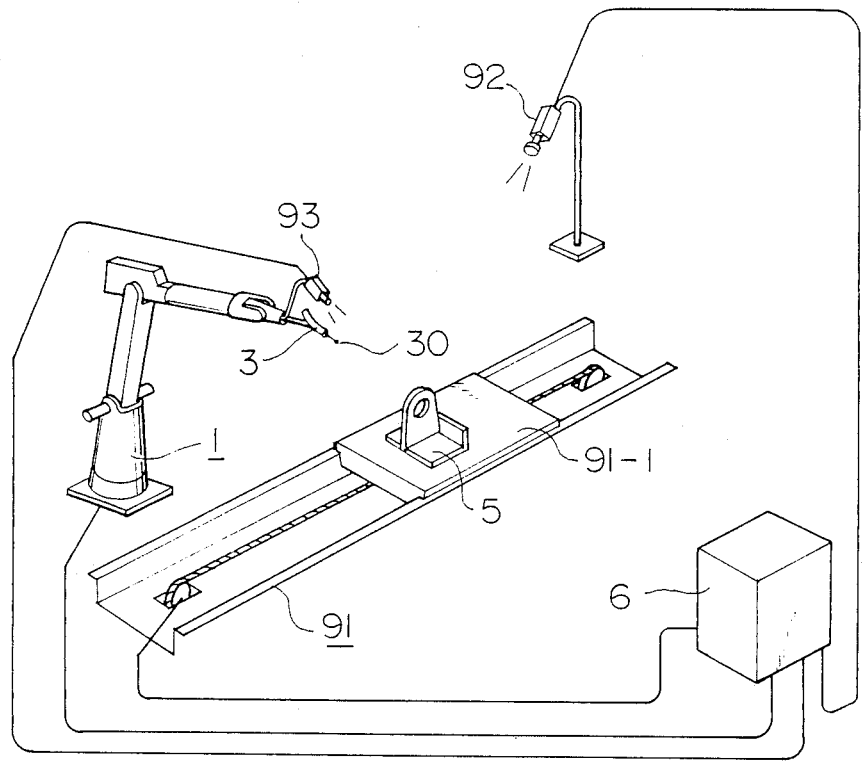
FIG. 10 is a perspective view of the system to which another embodiment of the present invention is to be applied.

Now referring to FIG. 10, another embodiment of the present invention will be explained. In the system of FIG. 10, robot 1, working tool 3 and working object 5 are the corresponding elements in FIG. 1. It is assumed that working object 5 is to be linearly moved on a conveyor 91 in the state where it is mounted on a conveyor stage 91-1. There are also provided a visual sensor 92 fixed to the universal coordinate system ($\Sigma U$) 8a and a working visual sensor 93 fixed to the working point arm of robot 1.

Figure 11:
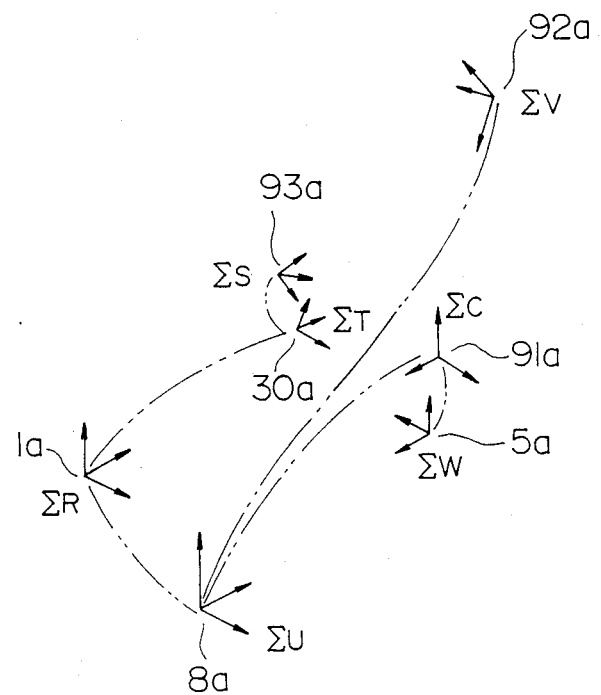
FIG. 11 is a view for explaining the coordinate systems set in the system of FIG. 10.

The following coordinate systems shown in FIG. 11 are defined for the respective devices of FIG. 10. A visual sensor coordinate system ($\Sigma V$) 92a is fixed to visual sensor 92; a working point coordinate system ($\Sigma S$) 93a is fixed to working point visual sensor 93; and a conveyor coordinate system ($\Sigma C$) 91a is fixed to conveyor 91. Robot coordinate system ($\Sigma R$) 1a, work coordinate system ($\Sigma W$), 5a, etc. are fixed in the same way as in FIG. 5.

Unlike the system of FIG. 1, in the system of FIG. 10, conveyor 91 and sensors 92 and 93, which are peripheral devices, are input devices for robot control apparatus. The present invention, however, is applicable to such a case without changing its concept as explained below.

First, the conversion matrix between universal coordinate system ($\Sigma U$) 8a and conveyor coordinate system ($\Sigma C$) 91a is defined as $A_U{}^C$ (or $A_C{}^U$); that between universal coordinate system 8a and visual sensor coordinate system ($\Sigma V$) 92a is defined as $A_U{}^V$ (or $A_V{}^U$); and that between tool coordinate system ($\Sigma T$) 30a and working point visual sensor coordinate system ($\Sigma S$) 93a is defined as $A_T{}^S$ (or $A_S{}^T$).

Now it is assumed that work coordinate system ($\Sigma W$) is designated as a control coordinate system, and a discriminator 591 of the control coordinate system coincides with work coordinate system ($\Sigma W$). With reference to the data flow shown in FIG. 12, the operation of the system of FIG. 10 will be explained.

First, with respect to the position of working object 5 mounted on a pallet (stage) 91-1 of conveyor 91, deviation between its position 5-2 in executing work and the position in teaching work is detected by visual sensor 92. This result (data 921) is ${}^V\Delta$ expressed by visual sensor coordinate system ($\Sigma V$) 92a.

Then, assuming that work teaching time $t = t_T$, and working starting time $t = t_S$, $${}^V\Delta = A_V{}^W(t_S) \cdot A_W{}^V(t_T) \tag{8}$$

where $A_W$ and $A_V$ represent a relationship visual sensor coordinate system 92a and work coordinate system 5a.

Also, $$A_V{}^W = A_V{}^U \cdot A_V{}^C \cdot A_C{}^W \tag{9}$$

Thus, using $$A_V{}^W(t_T) = A_V{}^U(t_T) \cdot A_U{}^C(t_T) \cdot A_C{}^W(t_T) \tag{10}$$

and $$A_V{}^W(t_S) = A_V{}^U(t_S) \cdot A_U{}^C(t_S) \cdot A_C{}^W(t_S) \tag{11}$$

the following equations are obtained $$A_C{}^W(t_T) = A_C{}^U(t_T) \cdot A_U{}^V(t_T) \cdot A_V{}^W(t_T) \tag{10'}$$

and $$A_C{}^W(t_S) = A_C{}^U(t_S) \cdot A_U{}^V(t_S) \cdot A_V{}^W(t_S) \tag{11'}$$

Thus, $$A_C^W(t_S) = A_C^U(t_S) \cdot A_U^V(t_S) \cdot {}^V\!\Delta \cdot A_V^U(t_T) \times A_U^C(t_T) \cdot A_C^W(t_T) \quad (12)$$

where $A_C^W(t_T)$ represents a relationship of working object 5 with conveyor 91 at the work teaching time. Assuming that at the work teaching time, conveyor coordinate system ($\Sigma C$) 91a coincides with work coordinate system ($\Sigma W$) 5a, it can be generalized as $$A_C^W(t_T) = \mathrm{II} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (13)$$

Further, assuming for simplicity that $A_U^C$ and $A_U^V$ are constant regardless of time, Equation (12) can be expressed $$A_C^W(t_S) = {}^C\!\Delta = A_C^U \cdot A_U^V \cdot {}^V\!\Delta \cdot A_V^U \cdot A_U^C \quad (12)'$$

Namely, $A_C^W(t_S)$ represents position deviation of working object 5 at the work teaching time and the work executing time, when viewed from conveyor coordinate system ($\Sigma C$) 91a; it is referred to as data 921'. As a result, it can be understood that the processings of Equations (12) and (12)' are the same the correction of positioning error as explained in the previous embodiment.

Figure 12:
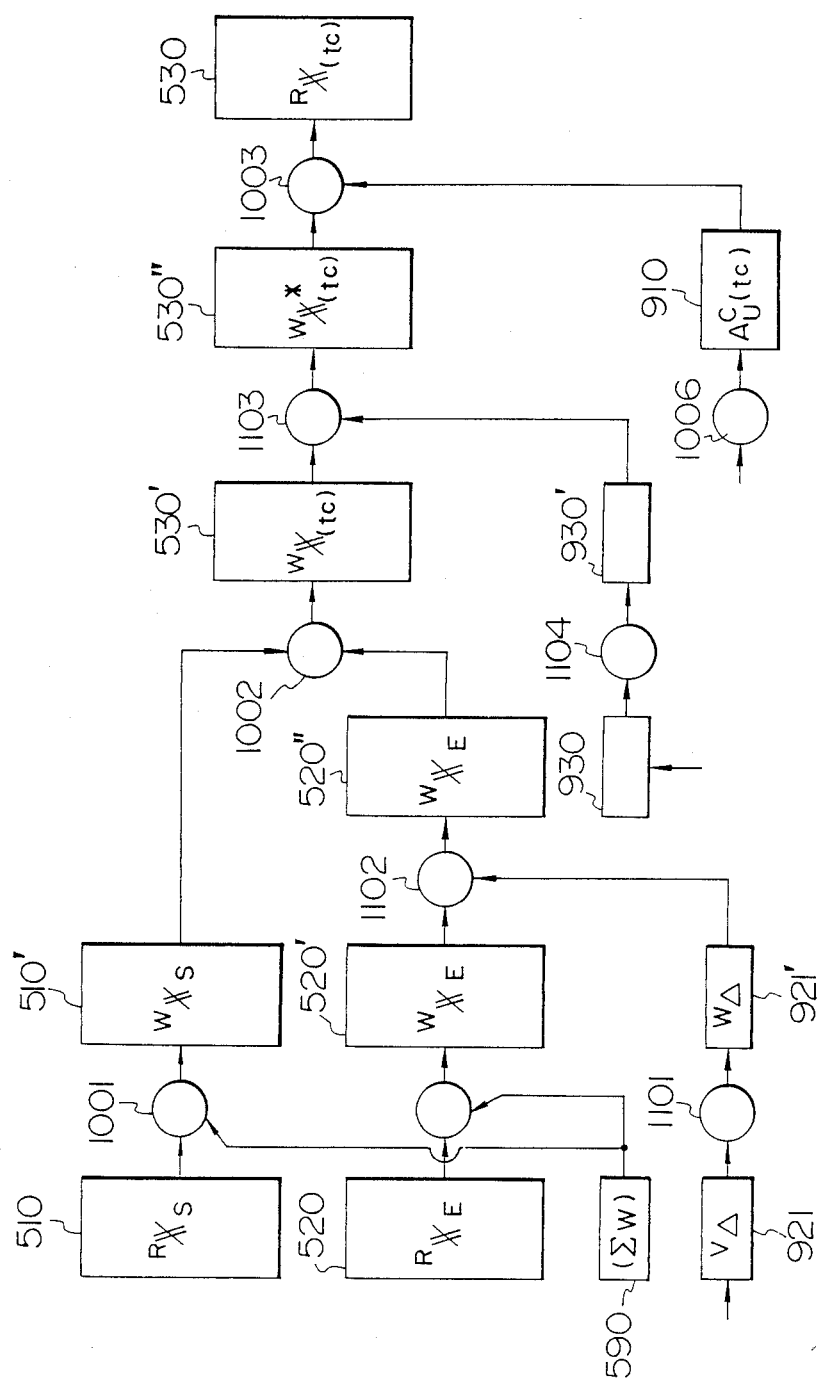
FIG. 12 is a data flow diagram in controlling the operation of the system of FIG. 10.

The data flow diagram shown in FIG. 12 is the same as that shown in FIGS. 3 and 4 in their basic part. However, it should be noted that the interpolation target point data 520 will be corrected using the data 921 obtained by visual sensor 92. First, in processing 1101, data 921 is converted into the 921' by the control coordinate system. On the other hand, in conversion processing 1001, the interpolation target data 520 is converted into the data 520' expressed in the control coordinate. The data 520' is corrected in correction processing 1102 using data 921' to provide corrected data 520" ($^W\!X_E^*$). Using the corrected data 520", which can be regarded as the interpolated data 520' in FIG. 3, and the position data 520' of robot 1 expressed in the coordinate system, interpolation processing 1102 is executed to provide interpolated position data 520'.

in the data flow shown in FIG. 12, the case where conveyor 91 is moved together with the advance of the work is considered. The operation of conveyor 91, taken as the conversion into universal coordinate system ($\Sigma U$) 8a can be expressed, for example, as $$A_U^C = \begin{bmatrix} 1 & 0 & 0 & P_{CX+nlc} \\ 0 & 1 & 0 & P_{CY+olc} \\ 0 & 0 & 1 & P_{CZ+alc} \\ 0 & 0 & 0 & 1 \end{bmatrix} \quad (14)$$

This conversion matrix $A_U^C$ represents data 910. ($P_{CX}$, $P_{CY}$, $P_{CZ}$) is an origin point of conveyor coordinate system ($\Sigma C$) 91a relative to universal coordinate system; and n, o and a are the direction cosines of the unit vectors taken in the operation direction of conveyor 91 relative to universal coordinate system; it should be noted that conveyor coordinate system is simplified to be parallel to universal coordinate system 8a. 1c is a traveling distance of conveyor 91 and is assumed to be 1c = 0 at t = $t_S$. The traveling distance of can be obtained by the position detector such as a rotary encoder for detecting the traveling amount of conveyor 91, or by adding up an input to a speed detector. The processing of providing this $A_U^C$ corresponds to processing 1006.

The interpolated position data 530' as well as the data 930' originating working point visual sensor 93 is subjected to the correction processing by working point visual sensor 93 (an overlapping processing explained later) 1103 to provide data 530" ($^W\!X^*(t_c)$). If the correction by working point visual sensor 93 is not executed, data 530" is apparently equivalent to data 530'.

Arithmetic processing 1003 in FIG. 12 is the same as that in FIG. 3, and executes the operation of the following Equation $$^R\!X(t_c) = A_R^U(t_c) \cdot A_U^C(t_c) \cdot A_C^W(t_c) \cdot {}^W\!X^*(t_c) \quad (15)$$

where $^W\!X^*(t_c)$ is corrected interpolated position/pose data 530" which is expressed in the control coordinate, i.e. work coordinate in this case. As a result of the operation of Equation (12), the corrected interpolated position/pose data ($^R\!X(t_c)$) 530 is obtained. The processings successive to processing 1003 are the same as in FIGS. 3 and 4. In this way, it is possible to execute the control operation including the control for visual sensor 92 and conveyor 91.

Further, the tracking path control such as seam tracking considering the data from working visual sensor 93 can be added in the following manner. Data 930 obtained from working point sensor 93, which is expressed by working point sensor ($\Sigma S$) 93a, is converted into data 930' which is expressed by the control coordinate system through processing 1004 in the same way as processing 1101 relative to visual sensor 92. The data 930' as well as interpolated position/pose data 530' is subjected to overlapping processing 1103 to provide corrected interpolated position/pose data 530". The data 530" is subjected to the processing 1003 corresponding to Equation (15). Further, the processings of processing 1004 et seq. follow.

The cases where inputs to robot control apparatus 6 are given by several coordinate systems have been explained. The processing manner including the arithmetic equations explained in this embodiment is not unique but can be modified in several forms. For example, although in this embodiment, all the input data are converted into the expression by the coordinate system and thereafter subjected to the correction or overlapping, the correction or overlapping may be executed in not the control coordinate system but any coordinate system in which the amount of arithmetic operation required to convert data is minimum.

The functions explained in the only two typical embodiments for simplicity of explanation are individual. Therefore, it is possible to realize a system in which these functions are combined. More specifically, the present invention can be applied to a wide application field from the case where robot 1 is to be only controlled using data by expressed by work coordinate system to the case where a total robot system combined with the traveling truck, positioner, several sensors, conveyor, etc. is to be cooperatively controlled in a unified way also considering setting errors; in accordance with the present invention, it is possible to control many kinds of systems in the unified manner in a 'data-driven' type construction using discriminators by only changing the discriminators of requisites such as input data, output data, etc. and that for designating the coordinated system without changing the software program.

The contents of the conversion matrices between the coordinate systems are different for respective systems, and a part thereof must be dealt with as a function of time. However, they are generalized as matrices (or matrix products) consisting of four rows and four columns so that in many cases, only the parameters equivalent to the discriminators have only to be changed. Even in the case where more complicated processing is required, the contents thereof can be summarized. Thus, the basic software such as a tracking path generating processing mainly including interpolation which is a basic algorithm for operation control is not entirely required to be changed. Incidentally, although in the above embodiments, the tracking path is created through interpolation, it may be created by any other suitable technique without influencing the essence of the present invention.

Finally, a method for easily implementing the concrete processing using a discriminator which is the heart of the present invention and the control part relating thereto will be explained.

Figure 13:
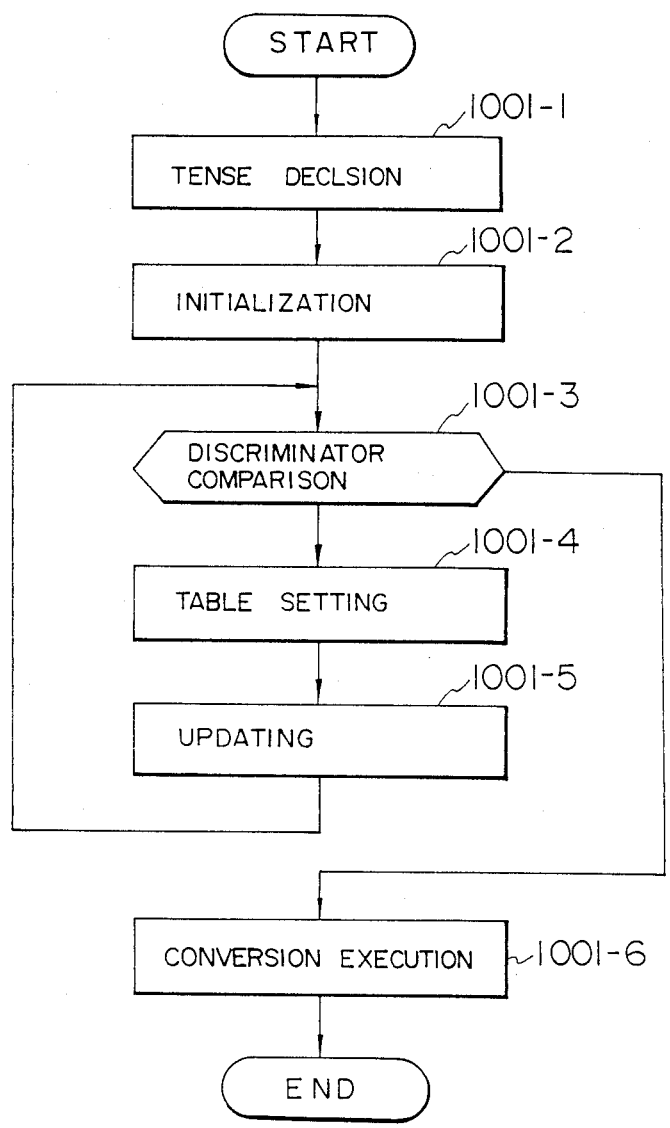
FIG. 13 is a flow chart showing the detail of the processing block 1001 in FIG. 4.
Figure 14:
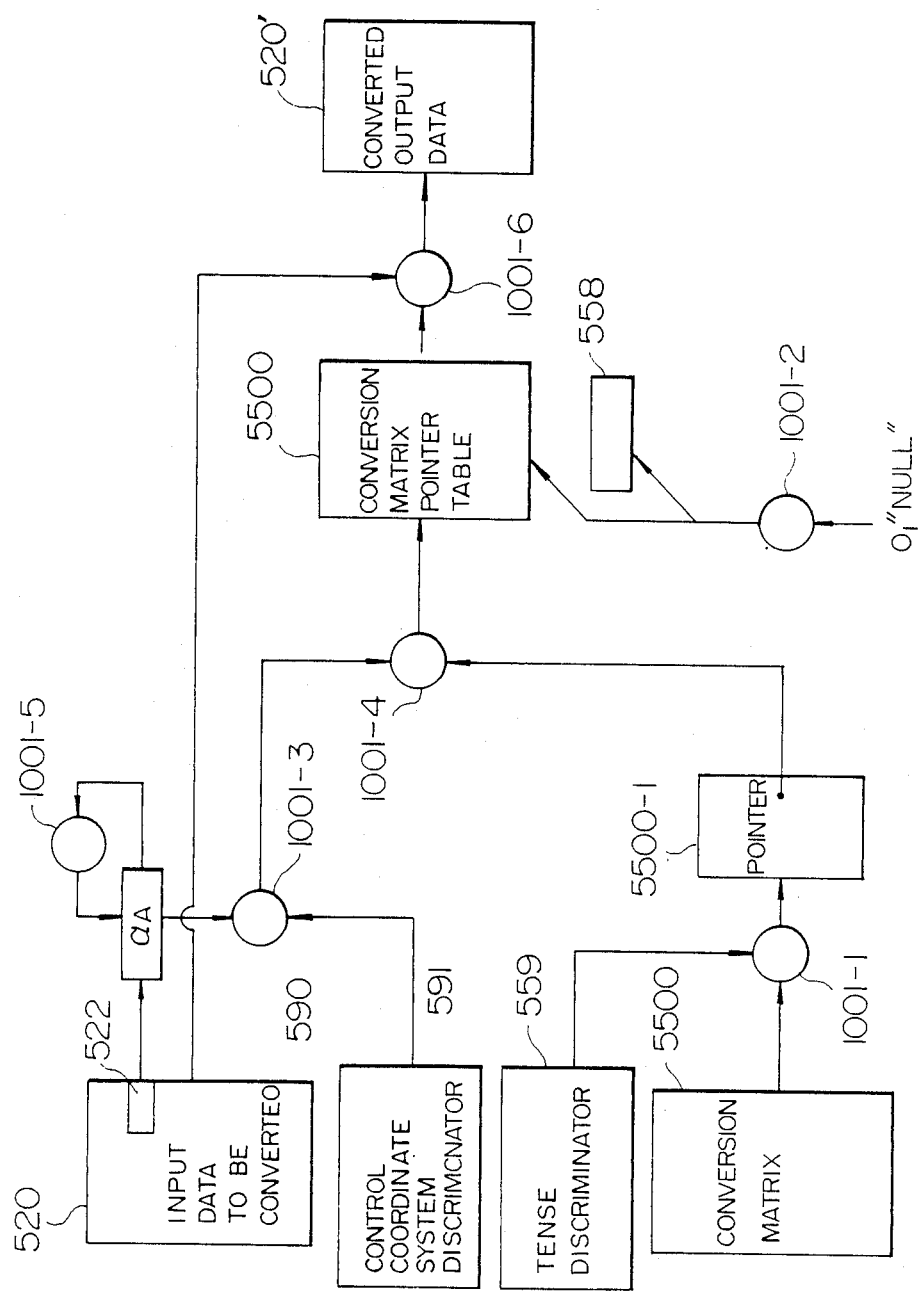
FIG. 14 is a diagram showing flow of data in operation shown by a flow chart of FIG. 13.

FIG. 13 shows the details of processing 1001 in FIG. 4 and FIG. 14 shows the corresponding data flow. It is assumed that a discriminator 591 for the control coordinate system is set in a control coordinate system designating table 591, and also assumed that attention is directed to the discriminator 522 of the coordinate system for expressing interpolation target data 520 taken as input data. Further, it is assumed that the system shown in FIG. 1 is subjected to the processing at issue. The coordinate systems included in the system in FIG. 1 are provided with numbers as shown in FIG. 15. It should be noted that positioner coordinate system 4a is generalized as a peripheral coordinate system.

Figure 16:
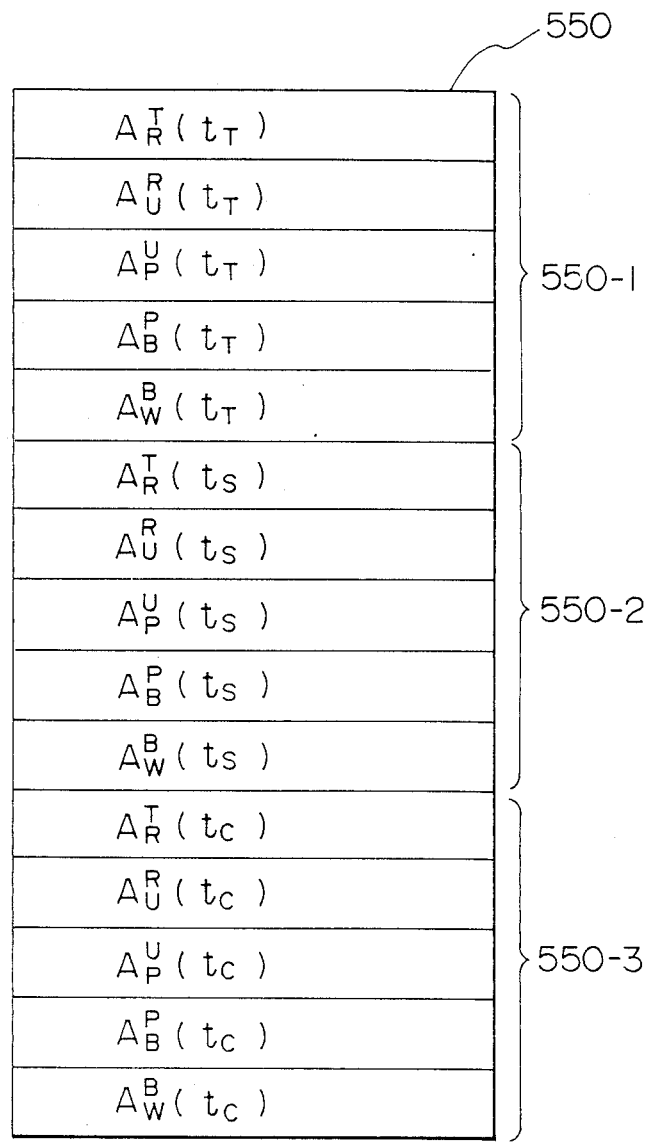
FIG. 16 is a view showing the conversion matrix table among coordinate systems.
Figures 17, 18:
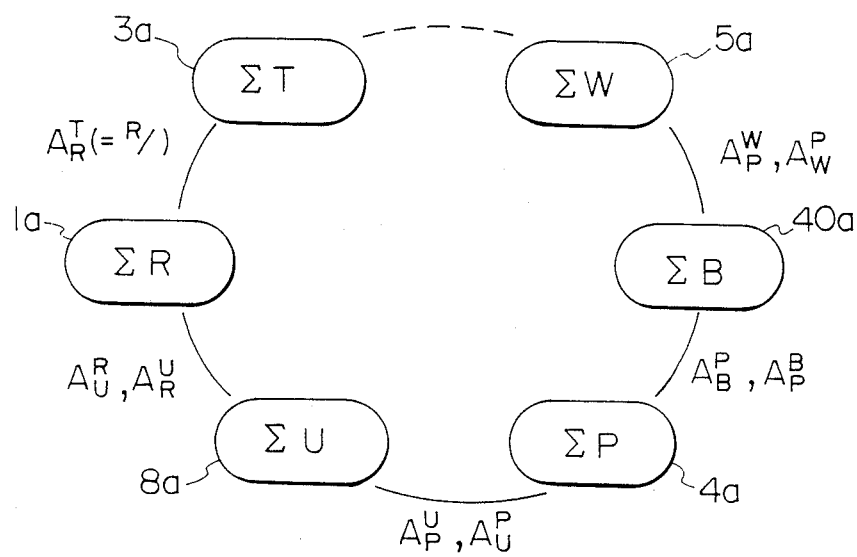
FIG. 17 is a table showing an example of the correspondence between tenses and their discriminator number.
FIG. 18 is a view showing the correlation in the systems of FIGS. 1 and 4.

Moreover, it is assumed that coordinate system conversion matrices are shown in a table of FIG. 16 which is provided with the numbers corresponding to numbers shown in FIG. 14. Now, the concept of tense as shown in FIG. 17 is introduced. The tense includes three times of interpolation teaching time (t $=t_T$), interpolation starting time (t $=t_s$), and current time (generally every moment during execution of the interpolation $t=t_c$). The table 550 consists of three sets each including five kinds of data, each data consisting of 16 (sixteen); these three sets are referred to as an interpolation teaching time matrices 550-1, interpolation starting time matrices 550-2 and current time matrices 550-3.

Five matrices $A_R{}^T$, $A_U{}^R$, $A_P{}^U$, $A_W{}^P$, and $A_W{}^B$ in 550-1 are periodically updated in their values by interruption signals or suitable periodic signals by an environment update arithmetic operation. Specifically, the origin position of the coordinated system fixed to the pertinent moving element and its posture are uniquely defined from the position and posture at each time obtained by the sensor provided at the pertinent moving element. Also, the position/pose of the coordinate system which is movable individually from the other moving element is monitored by a visual sensor or any other suitable means provided for the coordinate system so that it can be defined by an output signal from the visual sensor. Using the position/pose thus defined, the conversion matrix at each designated time is defined and stored in the table. That is, conversion matrix is always updated in accordance with each interruption signal or periodic signal by a new value obtained from the position/pose of the origin of each coordinate system at that time, and stored if required.

The concept of tense is introduced in order to deal with processings 1001, 1003, 1102, 1103, etc. in a unified manner. For example, in processing 1001 in which Equation (2-2) is used, the tense $t=t_T$, hence tense discriminator 559 ($y_A$) is designated as $y_A=1$ as shown in FIG. 17. On the basis of this tense designation, processing 1001-1 selects the table corresponding to the pertinent tense in the conversion matrix table 550 shown in FIG. 16, e.g. 550-1. An example of processing 1001-1 is calculation using $$Z_A = X_A + b_A + c_A \times (y_A - 1) \tag{16}$$

where $Z_A$ is the base address of the selected table; $X_A$ is the top address of the table; $b_A$ is the data length for each conversion matrix (the number of bytes if the address is expressed by units of byte); and $C_A$ is the number of conversion matrices relative to the same.

Next, in an initialization processing 1001-2, each element in a conversion matrix pointer table 5500 is initialized to "NULL" (absence of pointer data), and a conversion direction flag 558 ($S_A$). In this case, conversion matrix pointer table 5500 serves to store pointer (a base address or a group of base addresses) for a matrix or a group of matrices required to convert the position/pose data 520 which is an input to processing 1001 into the 520' expressed by the control coordinate system. The conversion direction flag 558 indicates, in FIG. 18 showing the conversion relationship among the coordinate systems included in the system of FIG. 1, in which of clockwise (negative) sense and counter-clockwise (positive) sense the conversion advances; this flag is used because the conversion matrix itself or its inverse matrix is used in accordance with the sense of conversion and contributes to reduce the amount of data to be stored. The positive sense is represented by $S_A = 0$, and the negative sense $S_A = 1$.

Next, a discriminator comparing processing 1001-3 compares the discriminator 522 (its value is represented by $\alpha_A$) of the coordinate system expressing the input data (interpolation target data 520 in the case at issue) with the discriminator 591 (its value is represented by $\beta_A$ of the output coordinate system (control coordinate system in the case at issue). The comparison is executed by dealing with the number added to the respective coordinate systems shown in FIG. 15 as numerical values. Namely, $\alpha_A$ and $\beta_A$ are compared.

As a result of the comparison, if $\alpha_A = \beta_A$, processing 1001-3 is ended and succeeded by a processing 1001-6.

If $\alpha_A < \beta_A$, a table setting processing 1001-4 sets, in a first element 5500-1 of table 5500, the base address (its value is represented by $V_A$) of the conversion matrix data 550-9 from coordinate number $\alpha_A$ to $\alpha_A + 1$.

Also in the case where $\alpha_A > \beta_A$, substantially the same processing as processing 1101-4 is executed. Processing 1001-4 sets, in the first element 5500-1 of table 5500, the base address (pointer: value $V_A$) of the conversion matrix data from $\alpha_A$ to $\alpha_A - 1$.

Both processings are formulated as $$V_A = Z_A + b_A \times (\alpha_Z + S_A) \tag{17}$$

Successively to processing 1001-4, an updating processing 1001-5 replaces $\alpha_A$ by $\alpha_A + 1$ if $S_A = 0$ and replaces $\alpha_A$ by $\alpha_A - 1$ if $S_A = -1$; also processing 1001-5 updates the pointer to the area in which the data of table 5500 is to be set so that it directs second, third elements, etc. This processing corresponds to shifting the coordinate system from the input data coordinate system to the output coordinate system by one coordinate system.

Upon the completion of processing 1001-5, the procedure is returned to processing 1001-1 and the above processings are repeated until the relation $\alpha_A = \alpha_B$ results, i.e. the input coordinate system coincides with the output coordinate system.

Thus, a pointer (or a series of pointers, i.e. addresses) to the conversion matrix (a group of matrices) from the coordinate system expressing input position/pose data 520 to the output coordinate system will be set in table 5500. Also, set in the area successive to the pointer(s) required for table 5500 is "NULL" set in processing 1001-2.

If table 5500 can be prepared in this way, in a conversion execution processing 1001-6, pointers are taken out from the table and the conversion matrices represented by the pointers are applied to input data 520. This conversion operation is repeated until the pointer taken out from the table is "NULL". Thus, position/pose data 520' expressed by the output coordinate system (control coordinate system in the case now at issue) will be obtained Additionally, it should be noted that if conversion direction flag 558 ($S_A$) is $-1$, before the application of the respective matrices, their inverse matrices are calculated. In short, for example, the following equation $$X' = A_1^{S_A} \cdot A_2^{S_A} \cdot A_3^{S_A} X \tag{18}$$

will be calculated in the form of $$X' = S_1^{S_A}(A_2^{S_A}(A_3^{S_A}X)) \tag{19}$$

where $A^0 = A$, and $A^{-1}$ is the inverse matrix of A. Also, a product of the group of matrices may be previously calculated by $$X' = (A_1^{S_A} \cdot A_2^{S_A} \cdot A_3^{S_A})X \tag{18}''$$

This technique is particularly useful if the value of the conversion matrix does not vary while its operation is executed.

In executing the operation of the conversion matrices, a large amount of operation processing is required. For example, in order to calculate a product of two matrices each consisting of four rows and four columns, 64 times multiplications and additions are required. Therefore, in order to calculate Equation (18), 192 times multiplications and additions are required. This cannot be realized by the conventional microprocessor and co-processor in view of their capacity. However, using a device which can execute a product-sum operation at a high speed, called a digital signal processor (DSP) developed in recent years, the above matrix product can be calculated at high speed because it is a product-sum operation.

Figure 19:
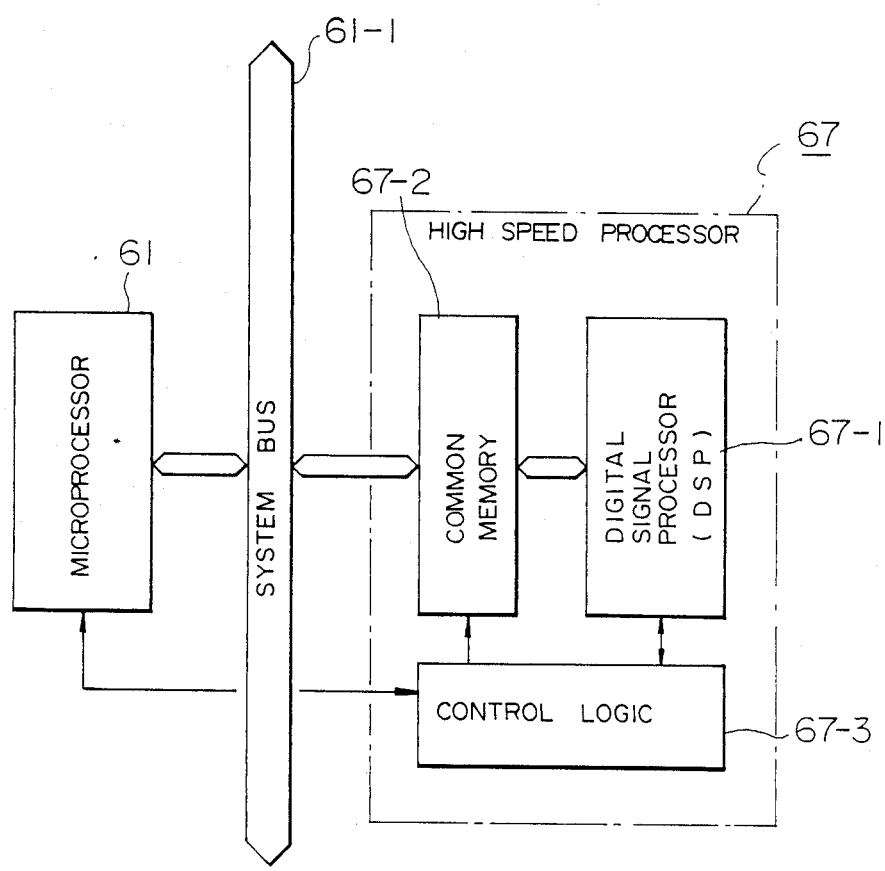
FIG. 19 is a block diagram of the high speed operator incorporated in the control device.

This DSP can be used as the high speed processor 67 shown in FIG. 2. In this case, as shown in FIG. 19, it is composed of a DSP part 67-1, a memory part 67-2 common to micro-processor 61 and a control logic part 67-3.

The common memory part 57-2 stores position/pose data 510, 520, 530, 510', 520', 530', 530'', conversion matrix data 551, 552, 553, etc. The DSP part 67-1 stores software for a monitor section and a processing execution section; the monitor section serves to always monitor a particular area of common memory part 67-2 and decode the data written in this area thereby to access the designated processing, and the processing execution section serves to read the data on the common memory part 67-2 to execute the operations of the matrix product and inverse matrices and write the results thereof in the common memory part 57-2. The control logic part 67-3 carries out synchronous control between microprocessor 61 and DSP part 67-1.

The robot control apparatus 6 incorporating high speed processor 67 having the above construction can execute the operations such as the matrix product at a very high speed in accordance with instructions from the microprocessor 61 and also in a real time when the robot operates.

It should be understood that the present invention is not restricted to the embodiments explained hitherto, and is applicable to any production system including a robot.

Also, the traveling truck and positioner and the coordinate system fixed to them are conceptual so that the present invention can be used regardless of actually adopted devices. For example, it is possible to suppose, as the peripheral coordinate system ($\Sigma P$), positioner 4 and also conveyor 91; further it is also possible to allot working object 5 to the peripheral coordinate system as the case may be. In short, these imaginary coordinate systems can be allotted to any optional device in accordance their use. Further, although six coordinate systems are used to the embodiments of the present invention, their number should not be limited to six as long as it is plural.

Moreover, although position/pose is taken as data to explain the embodiments of the present invention, the present invention is applicable to the case where the robot working point is controlled to follow a desired schedule in variation of force/torque or, any kind of parameters such as speed, acceleration, force and torque other than the position and pose, and also the number of the elements or freedoms can be optionally set.

Furthermore, although in the embodiments, both the data input coordinate system and the data output coordinate system (or control coordinate system) are explicitly designated using the corresponding discriminators, in a more simplified manner, it is possible to reduce the number of discriminators by fixing at least one of these coordinate systems.

Additionally the prior art system can be considered to be a system in which data input and output coordinate systems are fixed although it is desired to execute conversion processings. On the other hand, the basic idea of the present invention is to introduce the concept of discriminators for coordinate systems used for expressing data to greatly increase versatility and expandability of the robot control apparatus as described in connection with the embodiments of the present invention. It is apparent that the prior art system, which does not introduce the concept of descriminators cannot increase the versatility and expandability of the robot control apparatus if the software program is not changed. Finally, although it is assumed in the embodiments that the coordinate system expressing one kind of data is common, the coordinate system may be provided for each element of the data, e.g. each of the position and pose. In this case, at least one coordinate system may include an element of e.g. the joint angle of the robot.

In accordance with the present invention, by providing a discriminator to the coordinate system expressing physical data such as position and pose and also giving another discriminator to the other coordinate system into which the data is to be converted, thereby giving discriminators to the input and output coordinate systems for several kinds of data processings, the mutual synchronous and cooperative control among a robot and its peripheral devices can be easily realized without changing the software program in a robot control apparatus. Thus, a complicated control of a robot system can be easily realized; also a production system including the robot can be easily controlled in a unified manner, be enhanced in its flexibility, and be changed partially or time-limitedly. Attendantly on this, the maintenance of the software incorporated in the robot control apparatus can be improved, the software capacity can be reduced or changed, and the man-hour to be added can be reduced. Further, the applicability and expandability can be improved.

We claim:

1. A method for controlling a tracking path of a working element so that the working element moves along a path having a predetermined positional relationship with a working object by adjusting the relative positional relationship between the working element and the working object through the movement of individually movable at least one moving element each being operatively coupled with either the working element or the working object in a prescribed coupling condition, comprising the steps of:
    allotting individual coordinate systems each having a discriminator to said working element, said working object and said moving elements to provide the coordinate systems with the corresponding discriminators;
    setting as a coordinate system expressing the data for controlling the movement of said working element a first coordinate system selected from said coordinate systems;
    describing, using a second coordinate system selected from the coordinate systems, the data representing the positions of the working element corresponding to specific points on the tracking path along which said working element is to move on the basis of a prescribed working schedule to store the data together with the discriminator representative of the corresponding coordinate system;
    deciding in executing a real work if or not said first coordinate system and said second coordinate system are the same from their discriminator; and
    if both coordinate systems are different coordinate systems, converting the position data of the working element corresponding to the specific points into the data expressed in the first coordinate system and controlling the movement of said working element on the basis of the converted data.

2. A method according to claim 1, wherein said first coordinate system is fixed to said working element, and said second coordinate system is fixed to said working object.

3. A method for controlling the tracking path of a working element of an industrial robot so that the working element moves along a path having a predetermined positional relationship with a prescribed working object, wherein the relative positional relationship between the working element and the working object varies in accordance with the movement of plural individually movable at least one moving element each being operatively coupled with either the working element or the working object in a prescribed coupling condition, said method comprising the steps of:
    allotting individual coordinate systems each having a discriminator to said working element, said working object and said moving elements to provide the coordinate systems with the corresponding discriminators;
    setting as a coordinate system expressing the data for controlling the movement of said working element a first coordinate system selected from said coordinate systems;
    describing, using a second coordinate system selected from the coordinate systems, the data representing the positions of the working element corresponding to at least specific points on the tracking path along which said working element is to move on the basis of a prescribed working schedule to store the data together with the discriminator representative of the corresponding coordinate system;
    deciding prior to executing a real work if or not said first coordinate system and said second coordinate system are the same from their discriminators;
    if both coordinate systems are different coordinate systems, converting the position data of the working element corresponding to the specific point into the data expressed in the first cordinate system; and
    controlling the movement of said working element on the basis of the converted position data corresponding to said at least two specific points.

4. A method according to claim 3, further comprising the step of, after having converted the position data corresponding to said specific points into that expressed by said first coordinate system, calculating the data at at least one intermediate point on the tracking path between the two specific points, which is expressed by said first coordinate system, from the converted position data at said two specific points.

5. A method according to claim 4, wherein the conversion from the position data at the specific point expressed by said second coordinate system to that expressed by said first coordinate system is carried out using a conversion matrix between said coordinate systems which is defined by the relative positional relationship between said moving elements.

6. A method according to claim 5, wherein stored as the conversion matrix between said coordinate systems are a conversion matrix at a work teaching time which is obtained from the relative positional relationship among the coordinate systems at the work teaching time when the positional data of said working point corresponding to said specific points is obtained prior to executing said actual work, a conversion matrix at an actual work starting time which is obtained from the relative positional relationship among the coordinate systems at the actual work starting time, and a conversion matrix at a current time which is sequentially updated in accordance with the position change of the coordinate systems due to the movement of said moving elements, they are selected in accordance with the time when the data to be converted is acquired.

7. A method according to claim 3, further comprising the step of providing a sensor for monitoring the position of said working object to detect position error of said working object, converting the data indicative of the position error expressed by a sensor coordinate system fixed to said sensor into data expressed by said second coordinate system and modifying the position data of said working object expressed by said second coordinate system using the converted position error data of said working object.

8. A method according to claim 3, wherein said working point is a working tool attached to said robot, and a tool visual sensor for monitoring position error of said working tool to detect position error of said working tool is attached to said robot, further comprising the step of converting the data indicative of the position error expressed by a tool sensor coordinate system fixed to said tool visual sensor into data expressed by said second coordinate system and modifying the position data of said working point expressed by said second coordinate system using the converted position error data of said working object.

9. An apparatus for controlling a tracking path of a working point of an industrial robot so that the working point moves along a path having a predetermined positional relationship with a prescribed working object, wherein the relative positional relationship between the working element and the working object varies in accordance with the movement of individually movable at least one moving element, each being operatively coupled with either the working element or the working object in a prescribed coupling condition, said apparatus comprising discriminators for discriminating individual coordinate systems allotted to said working element, said working object and said plural moving elements;

means for controlling the movement of said working point on the basis of data expressed by a first coordinate system selected from said coordinate systems;

means for storing the discriminator selected as said first coordinate system;

means for describing, using a second coordinate system selected from the coordinate systems, the data representing the positions of the working element corresponding to at least specific points on the tracking path along which said working element is to move on the basis of a prescribed working schedule to store the data together with the discriminator representative of the corresponding coordinate system;

means for deciding, prior to executing actual work, if or not said first coordinate system and said second coordinate system are the same from their discriminators;

means for converting, if both coordinate systems are different coordinate systems, the position data of the working element corresponding to the specific point into the data expressed in the first coordinate system; and means for supplying to said means for controlling the movement of said working point said converted position data of said working point corresponding to said at least two specific points.

* * * * *